United States Patent [19]
Kiuchi et al.

[11] Patent Number: 5,751,137
[45] Date of Patent: May 12, 1998

[54] CONTROL SYSTEM FOR ELECTRIC POWER GENERATING APPARATUS ON VEHICLE

[75] Inventors: Takeo Kiuchi; Yutaka Tamagawa; Shigeru Ibaraki, all of Wako, Japan

[73] Assignee: Honda Giken Kogyo Kabushiki Kaisha, Tokyo, Japan

[21] Appl. No.: 637,536

[22] Filed: Apr. 25, 1996

[30] Foreign Application Priority Data

Apr. 28, 1995 [JP] Japan .................................. 7-106583

[51] Int. Cl.⁶ ........................................................ H02P 9/04
[52] U.S. Cl. .............................. 322/14; 180/65.4; 60/608; 60/285
[58] Field of Search .................................. 322/14, 15, 25, 322/28; 180/65.4; 60/608

[56] References Cited

U.S. PATENT DOCUMENTS

| | | |
|---|---|---|
| 512,941 | 8/1894 | Kiuchi et al. . |
| 513,097 | 8/1894 | Kiuchi et al. . |
| 513,140 | 8/1894 | Kiuchi et al. . |
| 4,757,686 | 7/1988 | Kawamura et al. .................. 60/608 |
| 5,371,412 | 12/1994 | Iwashita et al. ....................... 290/1 R |
| 5,426,938 | 6/1995 | Ogawa et al. .......................... 60/285 |
| 5,550,445 | 8/1996 | Nii ............................................ 318/153 |
| 5,566,774 | 10/1996 | Yoshida ................................. 180/65.4 |
| 5,588,498 | 12/1996 | Kitada ..................................... 180/65.4 |

OTHER PUBLICATIONS

U.S. Patent Application (submitted to U.S. Patent Office on Apr. 12, 1996—and as of the filing date of this Form PTO–1449 has had no receipt of the serial number); Control System for Electric Power Generating Apparatus on Hybrid Vehicle; Inventors: Takeo Kiuchi, Yutaka Tamagawa, and Shigeru Ibaraki (Attorney Docket No. 219/201) Ser. No. 08/632,518.

*Primary Examiner*—Steven L. Stephan
*Assistant Examiner*—Nicholas Ponomarenko
*Attorney, Agent, or Firm*—Lyon & Lyon LLP

[57] ABSTRACT

An electric power generating apparatus is mounted on a vehicle which has a propulsive electric motor powered by a battery, and has an electric generator and an internal combustion engine for actuating the electric generator to charge the battery depending on a charged/discharged state of the battery. A first operation controller operates the internal combustion engine to enable the electric generator to charge the battery if the amount of electric energy stored in the battery is smaller than a predetermined value or the time-dependent rate of increase of an amount of electric energy discharged from the battery is greater than a predetermined level. A second operation controller operates the internal combustion engine to purge a canister if the charged/discharged state of the battery fails to satisfy a condition for the first operation controller to operate the internal combustion engine and if the amount of a purged gas adsorbed in the canister is greater than a predetermined amount. The first and second operation controllers operate the internal combustion engine in modes established respectively for the first and second operation controllers such that a load imposed on the internal combustion engine when the internal combustion engine is operated by at least the second operation controller is smaller than a load imposed on the internal combustion engine when the internal combustion engine is operated by the first operation controller.

7 Claims, 15 Drawing Sheets

ECU, GCU DATA OUTPUT PROCESS

WARMING-UP PROCESS

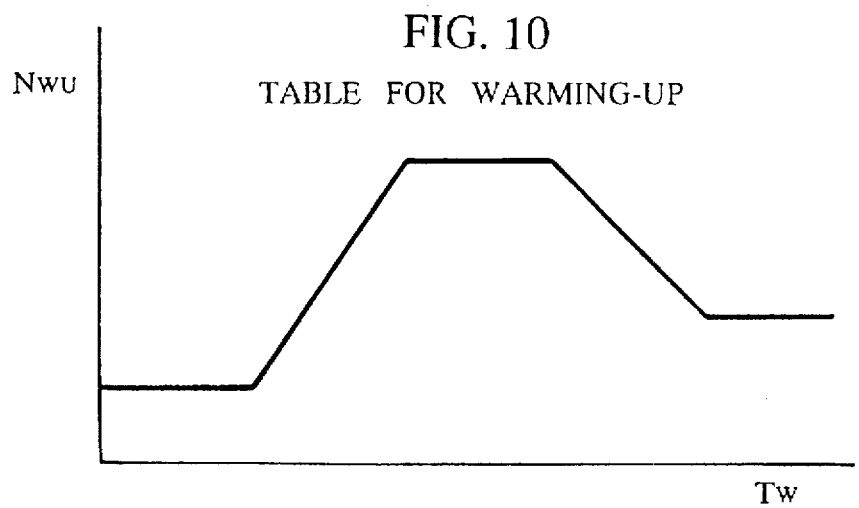
FIG. 10 TABLE FOR WARMING-UP
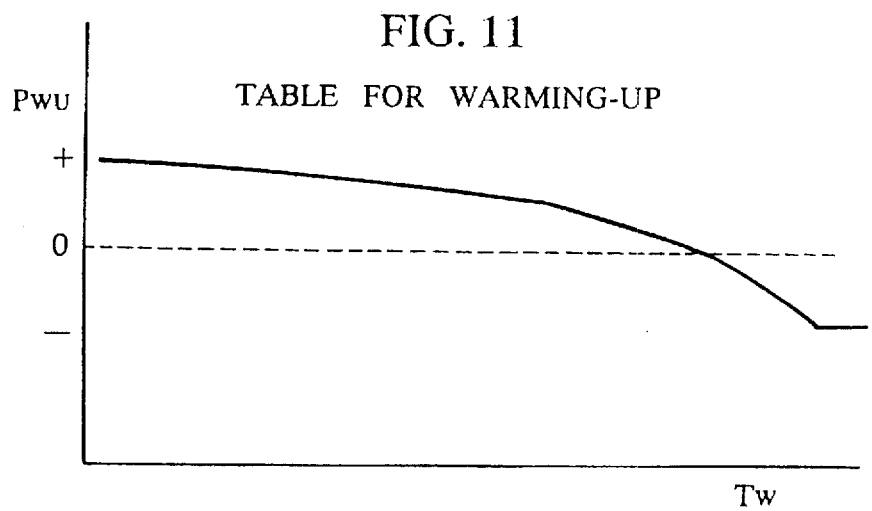
FIG. 11 TABLE FOR WARMING-UP
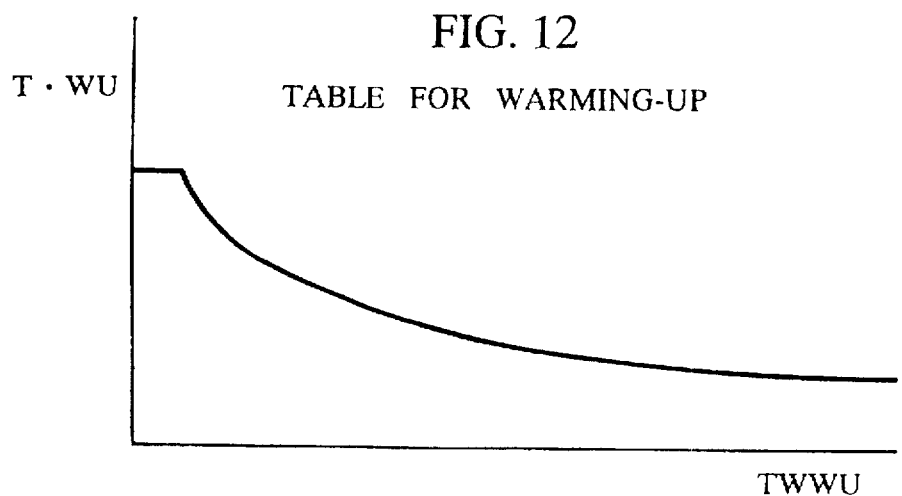
FIG. 12 TABLE FOR WARMING-UP

TABLE FOR GENERATION/CHARGE

GENERATION / CHARGE MAP

|  | $DOD_1$ | --------- | --------- | $DOD_4$ |
|---|---|---|---|---|
| $V_{CAR0}$ | | | | |
| | | | | |
| | | | $P_{ENE}$ | |
| | | | | |
| | | | | |
| $V_{CAR7}$ | | | | |

PROCESS OF CALCULATING LOAD CORRECTING VALUE KPACC

STOP PROCESS

TABLE FOR PURGING

TABLE FOR PURGING

CONTROL SYSTEM FOR ELECTRIC POWER GENERATING APPARATUS ON VEHICLE

BACKGROUND OF THE INVENTION

1. Field of the Invention

The present invention relates to a control system for controlling an electric power generating apparatus on a vehicle such as an electric vehicle.

2. Description of the Related Art

Electric vehicles propelled by a propulsive electric motor which is powered by a battery include hybrid vehicles which carry an internal combustion engine and an electric generator powered by the internal combustion engine for charging the battery.

On such a hybrid vehicle, when the amount of electric energy stored in the battery, i.e., the remaining capacity of the battery, is reduced to a certain level, the internal combustion engine is started to operate the electric generator, and the electric energy generated by the electric generator is supplied to charge the battery. In this manner, the battery is prevented from being excessively consumed thereby to extend the service life of the battery and also to maximize the mileage of the hybrid vehicle after the battery is fully charged. Since the internal combustion engine is started to actuate the electric generator only when the amount of electric energy stored in the battery is reduced to a certain level, the frequency of operation of the internal combustion engine is minimum, thus minimizing the emission of exhaust gases from the internal combustion engine.

The internal combustion engine on the hybrid vehicle is not operated not at all times, and tends to be switched off for a relatively long time. For example, if the battery is often charged by an external battery charger, then the time for which the internal combustion engine remains switched off is comparatively long. If the time for which the internal combustion engine remains switched off increases, then the amount of a gas vaporized off the fuel (gasoline) and trapped by a canister disposed in a fuel supply system of the internal combustion engine may exceed the adsorbing capability of the canister, and the excess amount of the vaporized gas is discharged into the atmosphere. However, the vaporized gas should not be discharged into the atmosphere as it contains components harmful to the environment.

One solution is to detect the amount of a purged gas which is adsorbed by the canister, and start the internal combustion engine to operate the electric generator when the detected amount exceeds a predetermined level. When the internal combustion engine is thus operated, the purged gas in the canister is used as the fuel combusted by the internal combustion engine, and the canister is purged.

However, the internal combustion engine is to be operated essentially for the purpose of charging the battery with electric energy generated by the electric generator. Therefore, when the internal combustion engine is operated, the electric generator is actuated thereby in order to generate an amount of electric energy which is large enough to charge the battery sufficiently. As a consequence, the load on the internal combustion engine is liable to be relatively large so as to generate the sufficiently large amount of electric energy. On the other hand, if the internal combustion engine is operated to actuate the electric generator in order to purge the canister while the battery has already been storing a sufficiently amount of electric energy, then the internal combustion engine will be subjected to a greater load than necessary, and will discharge an unduly large amount of exhaust gases.

SUMMARY OF THE INVENTION

It is therefore an object of the present invention to provide an electric power generation control system on a vehicle, which is capable of charging a battery and purging a canister at adequate times while minimizing the emission of exhaust gases from an internal combustion engine.

To achieve the above object, there is provided in accordance with the present invention a control system for controlling an electric power generating apparatus mounted on a vehicle which has a propulsive electric motor powered by a battery, and having an electric generator and an internal combustion engine for actuating the electric generator to generate an electric power output to charge the battery depending on a charged/discharged state of the battery, comprising charged/discharged state detecting means for detecting a charged/discharged state of the battery, purged-gas adsorbed state detecting means for detecting an adsorbed state of a purged gas in a canister disposed in a fuel supply system of the internal combustion engine, first operation control means for operating the internal combustion engine to enable the electric generator to charge the battery if the charged/discharged state detecting means detects when an amount of electric energy stored in the battery is smaller than a predetermined value or when a time-dependent rate of increase of an amount of electric energy discharged from the battery is greater than a predetermined level, and second operation control means for operating the internal combustion engine to purge the canister if the charged/discharged state of the battery detected by the charged/discharged state detecting means fails to satisfy a condition for the first operation control means to operate the internal combustion engine and if the purged-gas adsorbed state detecting means detects when an amount of the purged gas adsorbed in the canister is greater than a predetermined amount, wherein the first and second operation control means operate the internal combustion engine in modes established respectively for the first and second operation control means such that a load imposed on the internal combustion engine when the internal combustion engine is operated by at least the second operation control means is smaller than a load imposed on the internal combustion engine when the internal combustion engine is operated by the first operation control means.

If the charged/discharged state detecting means detects when an amount of electric energy stored in the battery is smaller than a predetermined value or when a time-dependent rate of increase of an amount of electric energy discharged from the battery is greater than a predetermined level, or stated otherwise, the amount of electric energy stored in the battery drops below a certain level or the battery is greatly discharged, then the first operation control means operates the internal combustion engine to actuate the electric generator, which supplies generated electric power to charge the battery. If a condition for the first operation control means to operate the internal combustion engine is not satisfied, or stated otherwise, the amount of electric energy stored in the battery is relatively large and the battery is not largely discharged, and if the purged-gas adsorbed state detecting means detects when an amount of the purged gas adsorbed in the canister is greater than a predetermined amount, i.e., the amount of the purged gas adsorbed in the canister is larger than a certain level, then the second operation control means operates the internal combustion engine in a mode different from the mode in which the first operation control means operates the internal combustion engine, for purging the canister. At this time, the second operation control means operates the internal combustion engine under a load smaller than the load which is imposed on the internal combustion engine when the internal combustion engine is operated by the first operation control means, with the result that the internal combustion engine discharges a relatively small amount of exhaust gases.

For charging the battery, the internal combustion engine and the electric generator are operated at an adequate time in a mode suitable for charging the battery. For purging the canister, the internal combustion engine is operated at an adequate time in a mode suitable for purging the canister. When the canister is purged, the load imposed on the internal combustion engine is relatively small for minimizing the emission of exhaust gases from the internal combustion engine. As a consequence, the battery can be charged and the canister can be purged at appropriate times while the emission of exhaust gases from the internal combustion engine is minimized.

The first and second operation control means may have means for controlling a rotational speed of the internal combustion engine after the internal combustion engine is started, and wherein the rotational speed of the internal combustion engine controlled by the second operation control means is lower than the rotational speed of the internal combustion engine controlled by the first operation control means. With this arrangement, when the internal combustion engine is operated to purge the canister, the load imposed on the internal combustion engine is smaller than when the internal combustion engine is operated to charge the battery, so that the emission of excessive exhaust gases can be suppressed.

In the above arrangement, for purging the canister, the rotational speed of the internal combustion engine controlled by the second operation control means may depend on an engine temperature of the internal combustion engine for reducing the load on the internal combustion engine.

For charging the battery, the rotational speed of the internal combustion engine controlled by the first operation control means may depend on an engine temperature of the internal combustion engine for a predetermined period of time after the internal combustion engine is started, and may depend on a vehicle speed of the vehicle after elapse of the predetermined period of time. During the predetermined period of time after the internal combustion engine is started, therefore, the internal combustion engine is not subject to an excessive load, and is warmed up depending on the engine temperature to operate the electric generator for charging the battery. After elapse of the predetermined period of time, the internal combustion engine is operated at a rotational speed depending on a running condition of the vehicle which discharges the battery, to operate the electric generator for charging the battery.

Furthermore, the first and second operation control means may have means for controlling an amount of electric power generated by the electric generator after the internal combustion engine is started, and the amount of electric power generated by the electric generator controlled by the second operation control means may be lower than the amount of electric power generated by the electric generator controlled by the first operation control means (may be nil). In this case, when the internal combustion engine is operated to purge the canister, the load imposed on the internal combustion engine is smaller than when the internal combustion engine is operated to charge the battery, so that the emission of excessive exhaust gases can be suppressed.

In the above arrangement, for purging the canister, the amount of electric power generated by the electric generator controlled by the second operation control means may depend on an engine temperature of the internal combustion engine for reducing the load on the internal combustion engine.

Moreover, for charging the battery, the amount of electric power generated by the electric generator controlled by the second operation control means may depend on an engine temperature of the internal combustion engine for a predetermined period of time after the internal combustion engine is started, and may depend on a vehicle speed of the vehicle and the charged/discharged state of the battery detected by the charged/discharged state detecting means after elapse of the predetermined period of time. During the predetermined period of time after the internal combustion engine is started, the load on the internal combustion engine which corresponds to the amount of electric power generated by the electric generator depends on the engine temperature, and the internal combustion engine is warmed up without an undue load imposed thereon, and the battery is charged at the same time. After elapse of the predetermined period of time, the battery can adequately be charged by the amount of electric power generated by the electric generator depending on the running condition of the vehicle and the charged/discharged state of the battery.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 10 is a diagram showing a data table used in the subroutine shown in FIG. 9;

FIG. 11 is a diagram showing another data table used in the subroutine shown in FIG. 9;

FIG. 12 is a diagram showing still another data table used in the subroutine shown in FIG. 9;

DETAILED DESCRIPTION OF THE PREFERRED EMBODIMENT

Figure 1:
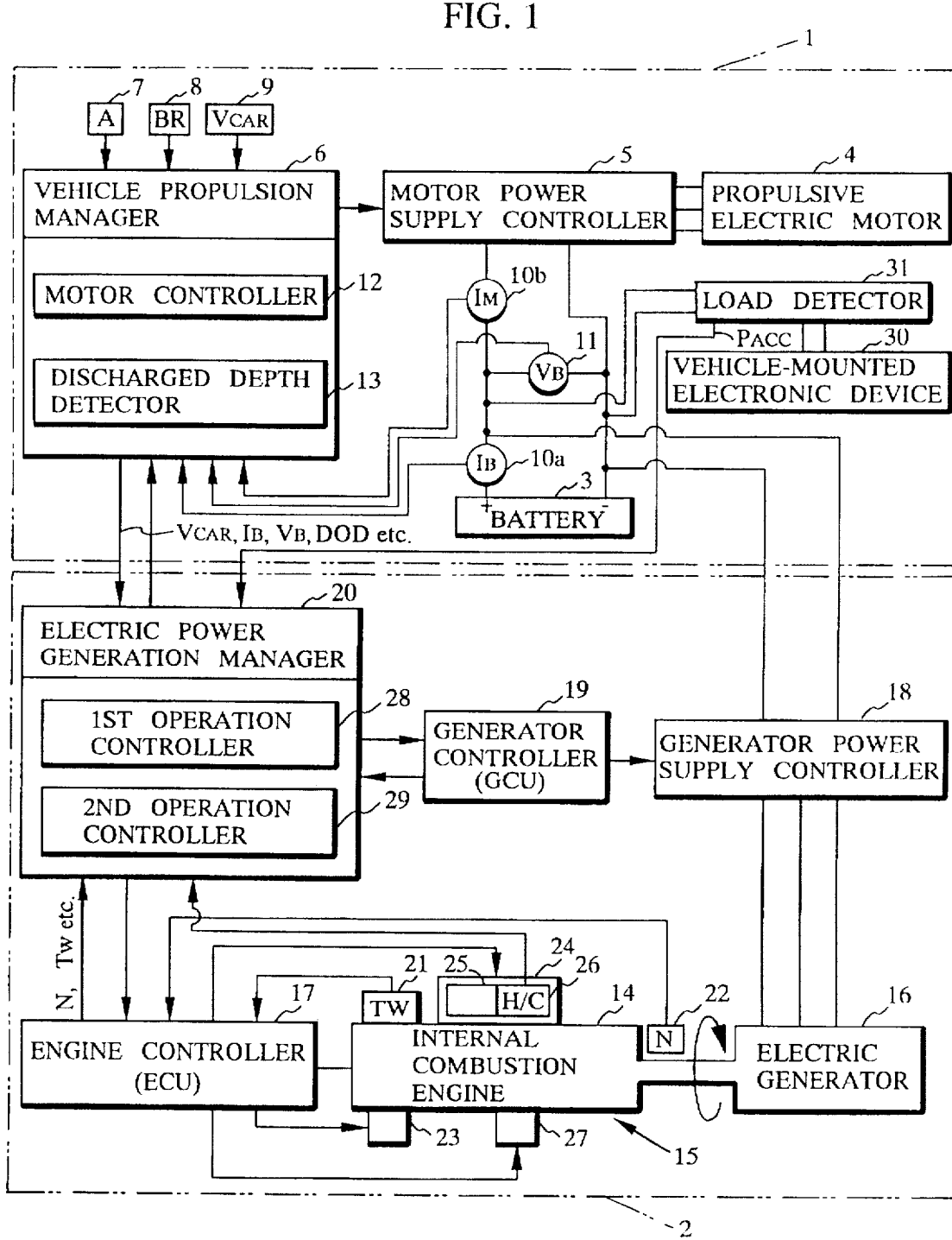
FIG. 1 is a block diagram of a hybrid vehicle which has a control system for controlling an electric power generating apparatus on the hybrid vehicle according to the present invention.

As shown in FIG. 1, a hybrid vehicle which has a control system for controlling an electric power generating apparatus on the hybrid vehicle according to the present invention, generally comprises a vehicle propulsion apparatus 1 and an electric power generating apparatus 2.

The vehicle propulsion apparatus 1 comprises a battery 3, a propulsive electric motor 4 powered by the battery 3 for propelling the hybrid vehicle, a motor power supply controller 5 including an inverter circuit, etc. (not shown) for controlling the supply of electric power between the battery 3 and the propulsive electric motor 4, a vehicle propulsion manager 6 for controlling operation of the propulsive electric motor 4 through the motor power supply controller 5 and detecting the depth to which the battery 3 is discharged (hereinafter referred to as a "discharged depth"), etc., an accelerator operation sensor 7 for detecting the amount by which the accelerator pedal is operated by the driver of the hybrid vehicle (hereinafter referred to as a "accelerator operational amount A"), a brake switch 8 for detecting whether the brake of the hybrid vehicle is operated by the driver or not, a vehicle speed sensor 9 for detecting a vehicle speed VCAR of the hybrid vehicle, a current sensor 10a for detecting a discharging current and a charging current of the battery 3 (hereinafter referred to as a "battery current IB"), a current sensor 10b for detecting a current flowing through the propulsive motor 4 (hereinafter referred to as a "motor current IM"), and a voltage sensor 11 for detecting a voltage across the battery 3 (hereinafter referred to as a "battery voltage VB"). The vehicle propulsion apparatus 1 further comprises various vehicle-mounted electronic devices 30 including lamps, windshield wipers, etc. energizable by the battery 3, and a load detector 31 for detecting a load imposed on the battery 3 by the vehicle-mounted electronic devices 30.

The vehicle propulsion manager 6 is implemented by a microcomputer or the like, and has, as its main functional units, a motor controller 12 for controlling operation of the propulsive electric motor 4 through the motor power supply controller 5 based on detected signals from the accelerator operation sensor 7, the brake switch 8, and the vehicle speed sensor 9, and a discharged depth detector 13 (charged/discharged state detecting means) for detecting a discharged depth indicative of an amount of electric energy stored in the battery 3 based on detected signals from the current sensor 10a and the voltage sensor 11.

The motor controller 12 basically determines a target torque and a target rotational speed for the propulsive electric motor 4 according to predetermined maps or the like based on the accelerator operational amount A detected by the accelerator operation sensor 7 and the vehicle speed VCAR detected by the vehicle speed sensor 9, and supplies the target torque and the target rotational speed which are determined to the motor power supply controller 5. The motor power supply controller 5 controls the amount of electric power supplied from the battery 3 to the propulsive electric motor 4 with switching pulses in order to operate the propulsive electric motor 4 at the target rotational speed to produce the target torque.

The motor controller 12 also instructs the motor power supply controller 5 to subject the propulsive electric motor 4 to regenerative braking when the accelerator operational amount A detected by the accelerator operation sensor 7 is reduced while the hybrid vehicle is running or the brake switch 8 outputs a brake signal BR indicating that the hybrid vehicle is braked. At this time, the motor power supply controller 5 causes the propulsive electric motor 4 to output a regenerated current and supplies the regenerative current to the battery 3, so that the propulsive electric motor 4 is subjected to regenerative braking. The regenerated current is detected by the current sensor 10b as a motor current IM flowing from the propulsive electric motor 4 through the motor power supply controller 5 to the battery 3.

The discharged depth detector 13 basically integrates the product of a battery current IB and a battery voltage VB, i.e., an electric power, which are detected at every given sampling time by the current sensor 10a and the voltage sensor 11, to determine an amount of discharged electric energy and an amount of charged electric energy on the basis of a fully charged condition of the battery 3, for thereby detecting a discharged depth DOD of the battery 3 from time to time. The discharged depth DOD of the battery 3 is 0% when the battery 3 is in a fully charged condition and 100% when the battery 3 is in a fully discharged condition, and increases from 0% to 100% as the amount of electric energy stored in the battery 3 (remaining capacity of the battery 3) decreases from the fully charged condition.

The vehicle propulsion manager 6 outputs the discharged depth DOD detected by the discharged depth detector 13, the vehicle speed VCAR detected by the vehicle speed sensor 9, a battery current IB detected by the current sensor 10a, a battery voltage VB detected by the voltage sensor 11, a command signal produced for regenerative braking by the motor controller 12, and a signal indicative of an amount of regenerated electric power to the electric power generation manager 20.

The propulsive electric motor 4 transmits its propulsive forces through a power transmitting system (not shown) to drive wheels (not shown) of the hybrid vehicle thereby to propel the hybrid vehicle.

The load detector 31 is connected in a feeder circuit from the battery 3 to the vehicle-mounted electronic devices 30. The load detector 31 detects a total amount of electric energy delivered from the battery 3 to the vehicle-mounted electronic devices 30, i.e., a total amount of electric energy discharged from the battery 3 to the vehicle-mounted electronic devices 30, with a current sensor or a voltage sensor (not shown), as a load PACC imposed on the battery 3 by the vehicle-mounted electronic devices 30. The load detector 31 then outputs the detected load PACC to the electric power generation manager 20. Alternatively, the number of vehicle-mounted electronic devices 30 which are in operation may be detected as the load imposed on the battery 3 by the vehicle-mounted electronic devices 30.

The electric power generating apparatus 2 comprises an engine system 15 including an internal combustion engine 14, an electric generator 16 powered by the internal combustion engine 14, an engine controller 17 (hereinafter referred to as an "ECU 17") for controlling operation of the engine system 15, a generator power supply controller 18 including an inverter circuit, etc. (not shown) for controlling the supply of electric power between the electric generator 16 and the battery 3 or the propulsive electric motor 4, a generator controller 19 (hereinafter referred to as a "GCU 19") for controlling operation of the electric generator 16 through the generator power supply controller 18, and an electric power generation manager 20 for managing and controlling the electric power generating apparatus 2 through the ECU 17 and the GCU 19.

The electric generator 16 has a rotor (not shown) coupled to the crankshaft (not shown) of the internal combustion engine 14 for rotation therewith at the same rotational speed as the rotational speed of the crankshaft.

The engine system 15 includes, as components associated with the internal combustion engine 14, a temperature sensor 21 for detecting an engine temperature (coolant temperature) TW of the internal combustion engine 14, a rotational speed sensor 22 for detecting a rotational speed N of the internal combustion engine 14 (=a rotational speed of the electric generator 16), a throttle valve actuator 23 for actuating a throttle valve (not shown) of the internal combustion engine 14, a fuel supply unit 24 for supplying fuel to the internal combustion engine 14, a canister 25 combined with the fuel supply unit 24, a hydrocarbon sensor 26 (purged gas adsorption detecting means, hereinafter referred to as an "H/C sensor 26") for detecting an adsorbed amount H/C of a purged gas (vaporized fuel) in the canister 25, and an ignition unit 27 for igniting fuel supplied to the internal combustion engine 14.

Each of the electric power generation manager 20, the ECU 17, and the GCU 19 is implemented by a microcomputer or the like. The electric power generation manager 20 has, as its functional units, a first operation controller 28 (first operation control means) for instructing the ECU 17 and the GCU 19 to operate the internal combustion engine 14 and the electric generator 16 for charging the battery 3, and a second operation controller 29 (second operation control means) for instructing the ECU 17 and the GCU 19 to purge the canister 25. According to instructions from the first operation controller 28 or the second operation controller 29, the ECU 17 controls operation of the internal combustion engine 14 through the throttle valve actuator 23, the fuel supply unit 24, and the ignition unit 27, and the GCU 19 controls operation of the electric generator 16 through the generator power supply controller 18. Details of operation of the electric power generation manager 20, the ECU 17, and the GCU 19 will be described later on.

The ECU 17 outputs an engine temperature TW detected by the temperature sensor 21 and a rotational speed N detected by the rotational speed sensor 22 to the electric power generation manager 20. The GCU 19 outputs a signal indicative of a voltage and a current generated by the electric generator 16 which is controlled by the generator power supply controller 18 to the electric power generation manager 20. The electric power generation manager 20 is also supplied with an adsorbed amount H/C of a purged gas in the canister 25 from the H/C sensor 26.

Operation of the control system according to the present invention will be described below.

Figure 2:
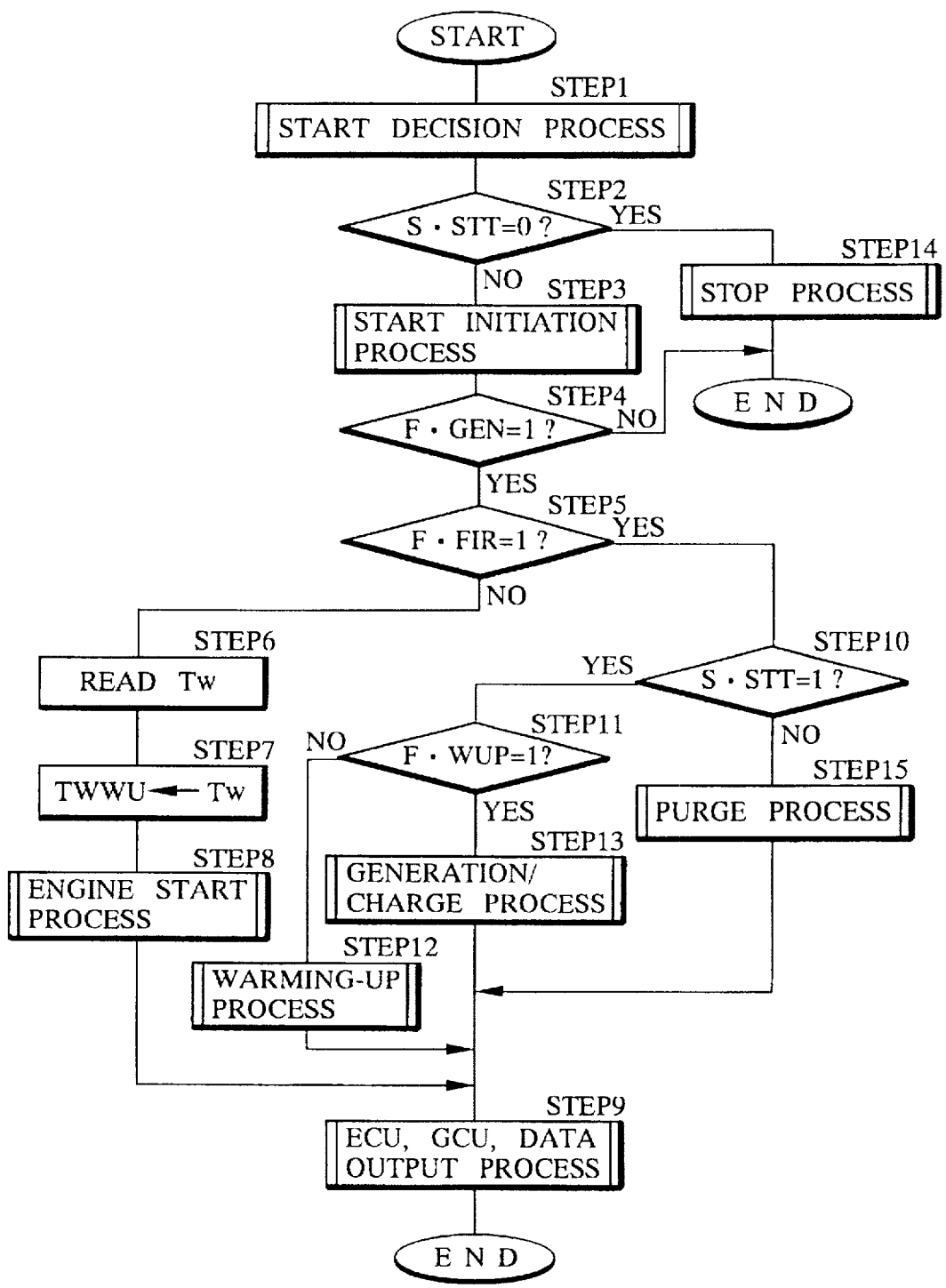
FIG. 2 is a flowchart of a main routine of an operation sequence of the control system shown in FIG. 1.

While the vehicle propulsion apparatus 1 is operating such as while the hybrid vehicle is running or temporarily stopping, the electric power generation manager 20 executes a main routine shown in FIG. 2, including various subroutines, in every cycle time of 10 ms, for example.

First, the electric power generation manager 20 executes a start decision process as a subroutine for deciding whether the electric power generating apparatus 2 is to be started or not and a mode of operation to start the electric power generating apparatus 2 (STEP 1).

Figure 3:
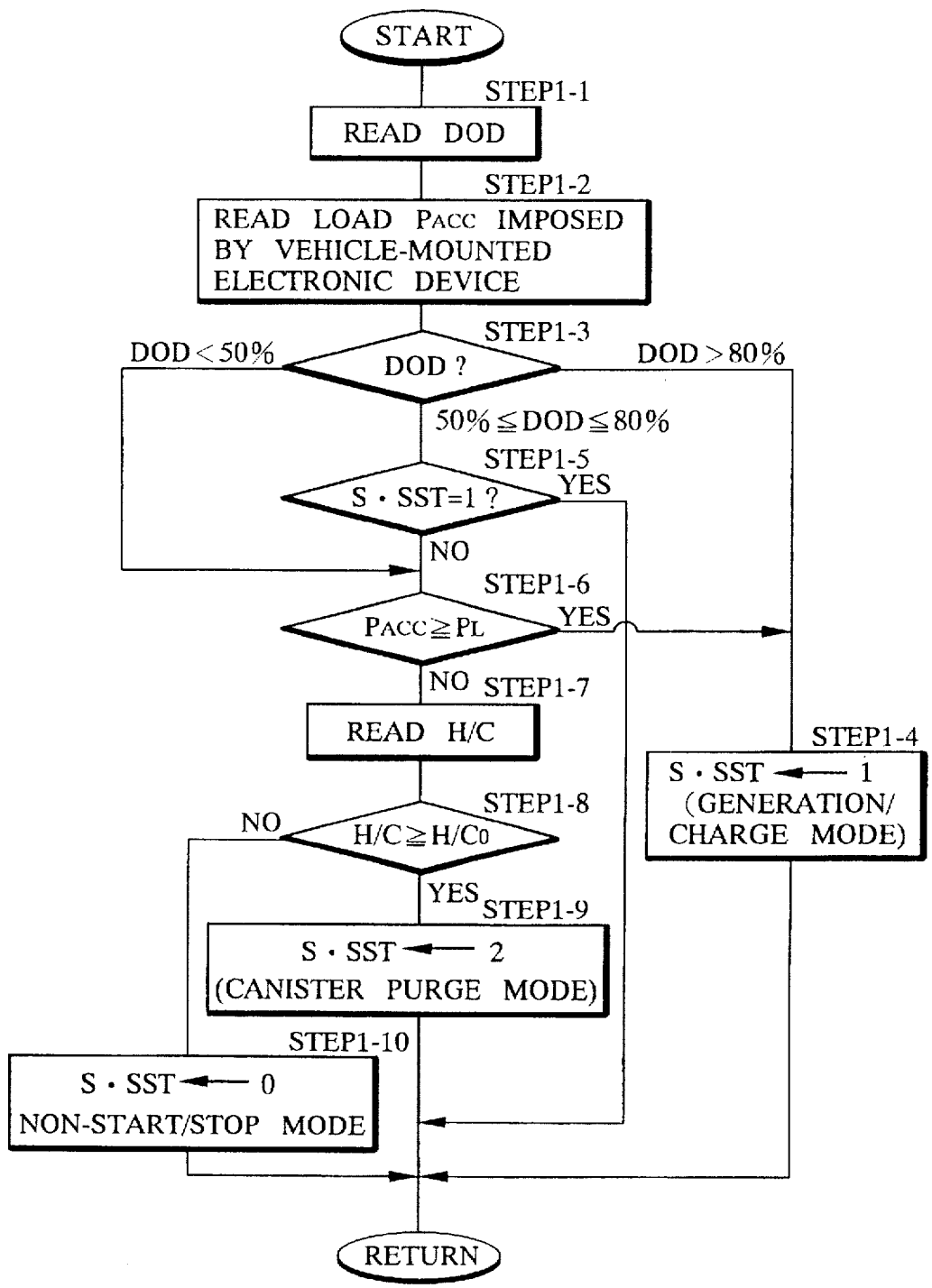
FIG. 3 is a flowchart of a subroutine in the main routine shown in FIG. 2.

In the start decision process, as shown in FIG. 3, the electric power generation manager 20 reads a present discharged depth DOD of the battery 3 from the vehicle propulsion manager 6 (STEP 1-1), and also reads a load PACC imposed on the battery 3 by the vehicle-mounted electronic devices 30 as detected by the load detector 31 (STEP 1-2).

The electric power generation manager 20 then decides whether the present discharged depth DOD is DOD>80%, 50%≦DOD≦80%, or DOD<50% (STEP 1-3).

If DOD>80% in STEP 1-3, i.e., if the amount of electric energy stored in the battery 3 (remaining capacity of the battery 3) is considerably small, then the electric power generation manager 20 sets a start mode identifier S-SST to "1" (STEP 1-4). Thereafter, control returns to the main routine shown in FIG. 2. The start mode identifier S-SST can be set to either "0", "1", or "2". The start mode identifier S-SST which is set to "0" indicates a mode not to start the electric power generating apparatus 2 or to stop the electric power generating apparatus 2 (hereinafter referred to as a "non-start/stop mode"). The start mode identifier S-SST which is set to "1" indicates a mode to start the internal combustion engine 14 to enable the electric generator 16 to generate electric power to charge the battery 3 (hereinafter referred to as an "generation/charge mode"). The start mode identifier S-SST which is set to "2" indicates a mode to start the internal combustion engine 14 to effect a canister purge (hereinafter referred to as a "canister purge mode"), described later on. Since the start mode identifier S-SST is set to "1" in STEP 1-4, the electric power generating apparatus 2 is now in the generation/charge mode. The start mode identifier S-SST has its initial value set to "0".

If 50%≦DOD≦80% in STEP 1-3, the electric power generation manager 20 ascertains a present value of the start mode identifier S-SST (STEP 1-5). If S-SST=1, i.e., if the electric power generating apparatus 2 is already in the generation/charge mode, then the start mode identifier S-SST is kept as it is, and control returns to the main routine shown in FIG. 2.

If S-SST≠1 in STEP 1-5, then the electric power generation manager 20 decides whether the load PACC read in STEP 1-2 is at least a predetermined amount PL or not, i.e., whether the amount of electric energy supplied from the battery 3 to the vehicle-mounted electronic devices 30 is relatively large or not (STEP 1-6). If PACC≧PL, then control goes to STEP 1-4 in which the start mode identifier S-SST is set to "1", and thereafter control returns to the main routine shown in FIG. 2.

If PACC<PL in STEP 1-6, then electric power generation manager 20 reads a present adsorbed amount H/C of a purged gas in the canister 25 from the H/C sensor 26 (STEP 1-7), and then decides whether or not the adsorbed amount H/C is equal or greater than a predetermined adsorbed amount H/C0 (STEP 1-8). If H/C≧H/C0, i.e., if the adsorbed amount H/C of a purged gas in the canister 25 has reached such a level that the canister 25 should be purged, then the electric power generation manager 20 sets the start mode identifier S-SST to "2" (STEP 1-9). Thereafter, control returns to the main routine shown in FIG. 2. The electric power generating apparatus 2 is now in the canister purge mode.

If H/C<H/C0 in STEP 1-8, i.e., if the adsorbed amount H/C of a purged gas in the canister 25 is not so large, then the electric power generation manager 20 sets the start mode identifier S·SST to "0" (STEP 1-10). Thereafter, control returns to the main routine shown in FIG. 2. The electric power generating apparatus 2 is now in the nonstart/stop mode.

If DOD<50% in STEP 1-3, i.e., if the amount of electric energy stored in the battery 3 is sufficiently large, then control jumps to STEP 1-6.

In the above start decision process, therefore, if the discharged depth DOD of the battery 3 exceeds 80%, indicating that the amount of electric energy stored in the battery 3 is considerably small, while the electric power generating apparatus 2 is stopped or stopping, or if the load PACC imposed on the battery 3 by the vehicle-mounted electronic devices 30 is at least the predetermined amount PL, indicating that the amount of electric energy supplied to the vehicle-mounted electronic devices 30 other than the propulsive motor 4 is relatively large, and the battery 3 is likely to be consumed quickly, though the amount of electric energy stored in the battery 3 is not considerably small (DOD≦80%), then the electric power generating apparatus 2 enters the generation/charge mode (S·SST=1). Otherwise, the electric power generating apparatus 2 enters the canister purge mode (S·SST=2) or the non-start/stop mode (S·SST=0) depending on the adsorbed amount H/C of a purged gas in the canister 25. Once the generation/charge mode is established, it is maintained until the discharged depth DOD of the battery 3 drops below 50% and the amount of electric energy stored in the battery 3 is sufficiently recovered, and also the load PACC imposed on the battery 3 by the vehicle-mounted electronic devices 30 becomes smaller than the predetermined amount PL.

After the above start decision process, the electric power generation manager 20 operates in the manner described below. It is assumed in the following description that the electric power generating apparatus 2 which has been stopping is brought into the generation/charge mode (S·SST=1) (DOD>80% or PACC≧PL) in the start decision process.

After having established generation/charge mode (S·SST=1) in the start decision process in STEP 1 of the main routine shown in FIG. 2, the electric power generation manager 20 confirms that S·SST≠0 in STEP 2, and executes STEPs 3–9 in every cycle time to start the internal combustion engine 14.

Specifically, the first operation controller 28 of the electric power generation manager 20 executes a start initiation process as a subroutine for starting the ECU 17 and the GCU 19 in STEP 3.

Figure 4:
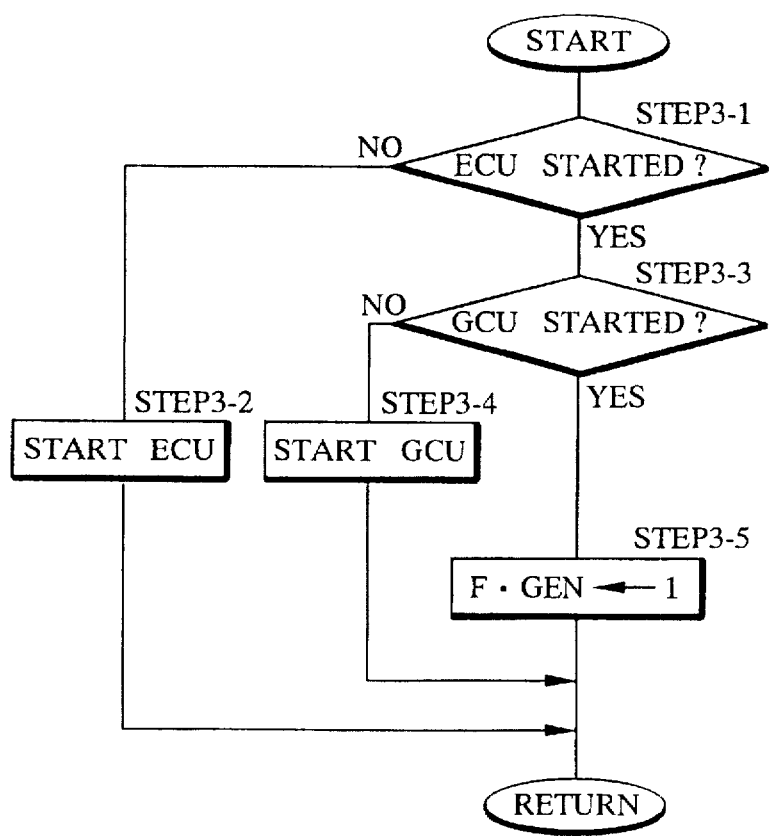
FIG. 4 is a flowchart of another subroutine in the main routine shown in FIG. 2.

In the start initiation process, as shown in FIG. 4, the first operation controller 28 decides whether the ECU 17 has started or not based on a response signal from the ECU 17 (STEP 3-1). If the ECU 17 has not started, then the first operation controller 28 gives a start command to the ECU 17 to start the ECU 17 (STEP 3-2), after which control returns to the main routine. If the ECU 17 has started in STEP 3-1, the first operation controller 28 decides whether the GCU 19 has started or not based on a response signal from the GCU 19 (STEP 3-3). If the GCU 19 has not started, then the first operation controller 28 gives a start command to the GCU 19 to start the GCU 19 (STEP 3-4), after which control returns to the main routine. If the GCU 19 has started in STEP 3-3, then the first operation controller 28 starts the ECU 17 and the GCU 19, and thereafter sets a flag F·GEN indicative of whether an actual start of the internal combustion engine 14 is to be initiated or not (hereinafter referred to as a "start initiation flag F·GEN") to "1" (STEP 3-5). Thereafter, control returns to the main routine. After control returns to the main routine, the value of the start initiation flag F·GEN is confirmed in STEP 4.

The start initiation flag F·GEN which is set to "1" indicates that preparations (the starting of the ECU 17 and the GCU 19) to actually start the internal combustion engine 14 are completed. The start initiation flag F·GEN which is set to "0" indicates that such preparations are not completed. The start initiation flag F·GEN has its initial value set to "0". When control returns from STEP 3-3 or STEP 3-4 to the main routine, the start initiation flag F·GEN maintains its initial value set to "0". Only if F·GEN=1 in STEP 4 of the main routine, control proceeds to STEP 5. If F·GEN=0 in STEP 4, then the main routine is ended.

Therefore, the ECU 17 and the GCU 19 are successively started in the start initiation process, and after they are started, control goes to STEP 5 of the main routine.

After having confirmed that F·GEN=1 in STEP 4, i.e., after having confirmed that preparations (the starting of the ECU 17 and the GCU 19) to actually start the internal combustion engine 14 are completed, the first operation controller 28 ascertains a flag F·FIR indicative of whether the internal combustion engine 14 is in a fully ignited condition or not, i.e., whether the starting of the internal combustion engine 14 is completed or not (hereinafter referred to as a "full ignition decision flag F·FIR").

The full ignition decision flag F·FIR is set to "1" when the full ignition of the internal combustion engine 14 is confirmed in an engine start process (STEP 8), described later on. Therefore, the full ignition decision flag F·FIR is "0" when the internal combustion engine 14 is not started yet. In this case, control proceeds from STEP 5 to STEP 6.

After having confirmed that F·FIR≠1 in STEP 5, the first operation controller 28 reads a present engine temperature TW from the temperature sensor 21 through the ECU 17 (STEP 6), and establishes the read engine temperature TW as a parameter TWWU for determining a time to warm up the internal combustion engine 14 (hereinafter referred to as a "warming-up time determining parameter TWWU") (STEP 7). After the warming-up time determining parameter TWWU has once been established when the starting of the internal combustion engine 14 is initiated, the warming-up time determining parameter TWWU is not updated until the starting of the internal combustion engine 14 is resumed.

After having established the warming-up time determining parameter TWWU, the first operation controller 28 executes an engine start process as a subroutine in STEP 8.

Figure 5:
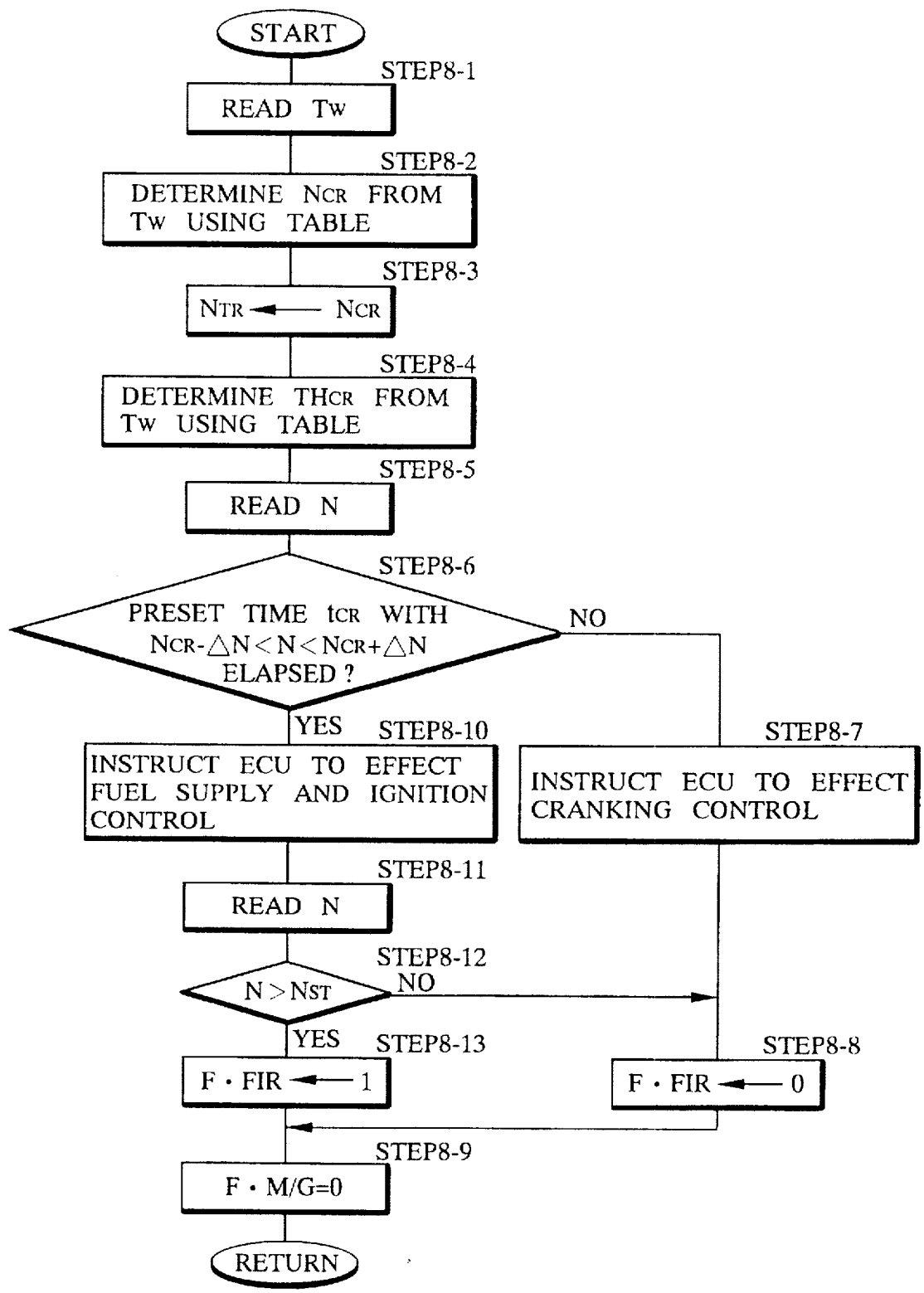
FIG. 5 is a flowchart of still another subroutine in the main routine shown in FIG. 2.
Figure 6:
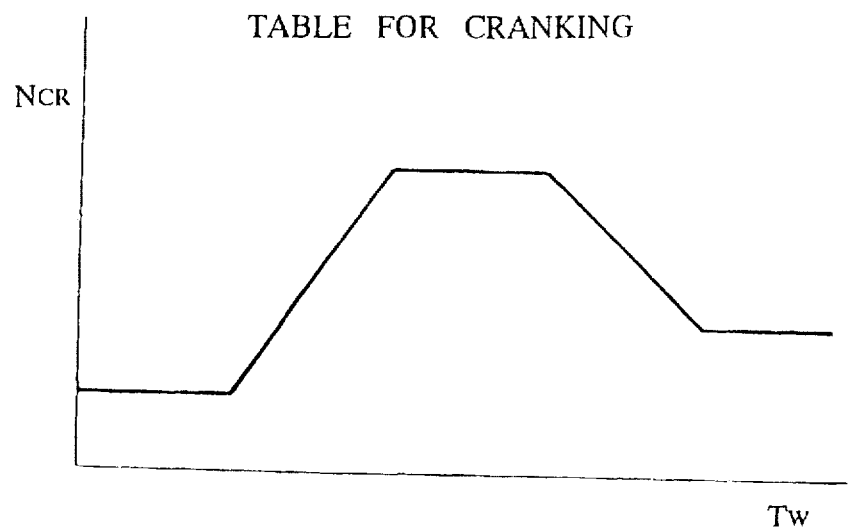
FIG. 6 is a diagram showing a data table used in the subroutine shown in FIG. 5.

In the engine start process, as shown in FIG. 5, the first operation controller 28 reads a present engine temperature TW from the temperature sensor 21 through the ECU 17 (STEP 8-1), and determines a cranking rotational speed NCR of the internal combustion engine 14 corresponding to the read engine temperature TW from the read engine temperature TW according to a data table shown in FIG. 6 (STEP 8-2). Then, the first operation controller 28 establishes the cranking rotational speed NCR as a target rotational speed NTR for the internal combustion engine 14 (STEP 8-3).

Figure 7:
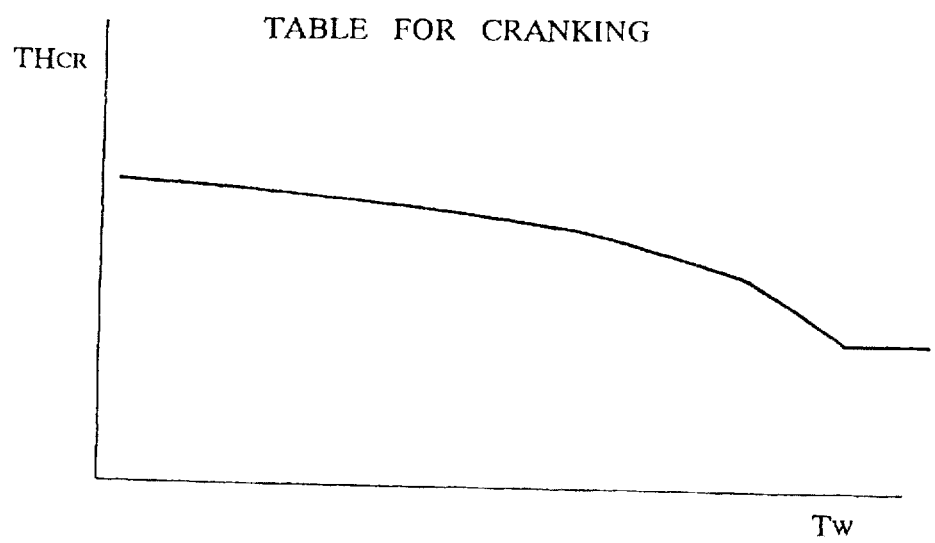
FIG. 7 is a diagram showing another data table used in the subroutine shown in FIG. 5.

The first operation controller 28 determines a throttle valve opening THCR of the internal combustion engine 14 corresponding to the engine temperature TW read in STEP 8-1 from the read engine temperature TW according to a data table shown in FIG. 7 (STEP 8-4). Cranking rotational speeds NCR shown in FIG. 6 and throttle valve openings THCR shown in FIG. 7 are determined in advance depending on engine temperatures TW, as rotational speeds and throttle valve openings capable of igniting and starting the internal combustion engine 14 for a better emission control capability of the internal combustion engine 14.

Then, the first operation controller 28 reads a present rotational speed N of the internal combustion engine 14 (=a rotational speed of the electric generator 16) from the rotational speed sensor 22 through the ECU 17 (STEP 8-5), and decides whether a preset time tCR has elapsed or not in which the read rotational speed N is kept in a predetermined range (NCR−ΔN<N<NCR+ΔN) with respect to the cranking rotational speed NCR determined in STEP 8-2 (STEP 8-6).

In this case, the preset time tCR has not elapsed because the internal combustion engine 14 has not started yet. The first operation controller 28 instructs the ECU 17 to effect cranking control on the internal combustion engine 14 (STEP 8-7), and sets the full ignition decision flag F·FIR to "0" (STEP 8-8). Thereafter, the first operation controller 28 sets a flag F·M/G indicative of whether the electric generator 16 is to operate as an electric generator or a starter motor of the internal combustion engine 14 (hereinafter referred to as a "generator/motor switching flag F·M/G") to "0" (STEP 8-9). Then, control returns to the main routine. The generator/motor switching flag F·M/G which is "0" indicates that the electric generator 16 is to operate as a starter motor of the internal combustion engine 14. The generator/motor switching flag F·M/G which is "1" indicates that the electric generator 16 is to operate as an electric generator.

After the above engine start process, the first operation controller 28 executes a data output process as subroutine for outputting data to the ECU 17 and the GCU 19 (STEP 9). Thereafter, the processing in the present cycle time is ended.

Figure 8:
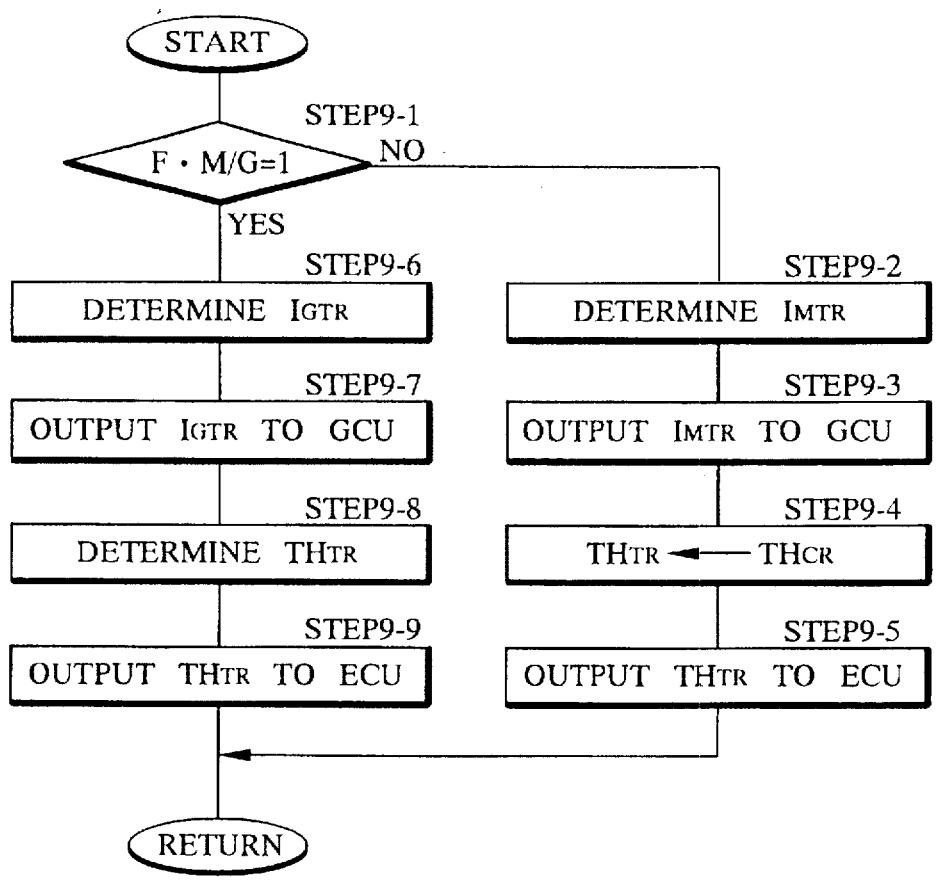
FIG. 8 is a flowchart of still another subroutine in the main routine shown in FIG. 2.

In the data output process, as shown in FIG. 8, the first operation controller 28 ascertains the generator/motor switching flag F·M/G in STEP 9-1. Since the generator/motor switching flag F·M/G has been set to "0" to operate the electric generator 16 as a starter motor, the first operation controller 28 determines a target amount IMTR of electric energy to be supplied to the electric generator 16 to operate the electric generator 16 as a starter motor (STEP 9-2), and outputs the target amount IMTR of electric energy to the GCU 19 (STEP 9-3). The target amount IMTR of electric energy is determined according to a given data table and equation as an amount of electric energy to be supplied to the electric generator 16 for bringing the present rotational speed N of the internal combustion engine 14 detected by the rotational speed sensor 22 into conformity with the cranking rotational speed NCR which has been established as the target rotational speed NTR in STEP 8-3 of the engine start process.

The first operation controller 28 establishes the throttle valve opening THCR which has been determined in STEP 8-4 of the engine start process as a target throttle valve opening THTR for the internal combustion engine 14 (STEP 9-4), and outputs the target throttle valve opening THTR to the ECU 17 (STEP 9-5). Thereafter, control goes back to the main routine.

The GCU 19 which is supplied with the target amount IMTR of electric energy controls the amount of electric energy supplied from the battery 3 to the electric generator 16 through the generator power supply controller 18 in order to operate the electric generator 16 as a starter motor for the internal combustion engine 14 according to the target amount IMTR of electric energy. The ECU 17 which is supplied with the target throttle valve opening THTR (=THCR) controls the throttle valve opening of the internal combustion engine 14 through the throttle valve actuator 23 in order to equalize the throttle valve opening of the internal combustion engine 14 to the target throttle valve opening THTR.

The internal combustion engine 14 now starts being cranked by the electric generator 16 operating as a starter motor.

The engine start process and the data output process are carried out in successive cycle times until the actual rotational speed N of the internal combustion engine 14 becomes substantially equal to the cranking rotational speed NCR, whereupon the condition in STEP 8-6 (see FIG. 5) of the engine start process is satisfied.

Then, as shown in FIG. 5, the first operation controller 28 instructs the ECU 17 to supply fuel to and ignite the internal combustion engine 14 (STEP 8-10). With the throttle valve opening of the internal combustion engine 14 being controlled at the target throttle valve opening THTR (=THCR), the ECU 17 controls the fuel supply unit 24 to supply fuel to the internal combustion engine 14 to start the same and also controls the ignition unit 27 to ignite the internal combustion engine 14 to start the same.

Thereafter, the first operation controller 28 reads a present rotational speed N of the internal combustion engine 14 from the rotational speed sensor 22 (STEP 8-11), and decides whether the rotational speed N has exceeded a predetermined starting rotational speed NST or not, thus deciding whether the internal combustion engine 14 has reached a fully ignited condition or not (STEP 8-12). Alternatively, it may be decided whether the internal combustion engine 14 has reached a fully ignited condition or not based on the load on the electric generator 16 which is operating as a starter motor or a change in the load on the internal combustion engine 14, i.e., whether a change in the load falls in a predetermined range or not.

If N≦NST in STEP 8-12, then the first operation controller 28 judges that the internal combustion engine 14 has not reached a fully ignited condition, and sets the full ignition decision flag F·FIR to "0" in STEP 8-8 and the generator/motor switching flag F·M/G") to "0" (STEP 8-9). Thereafter, control returns to the main routine. After the data output process, the internal combustion engine 14 is continuously cranked by the electric generator 16 operating as a starter motor, and the ECU 17 continuously controls the fuel supply unit 24 to supply fuel to and the ignition unit 27 to ignite the internal combustion engine 14 for starting the same.

If N>NST in STEP 8-12, then the first operation controller 28 judges that the internal combustion engine 14 has reached a fully ignited condition, and sets the full ignition decision flag F·FIR to "1" in STEP 8-13. Thereafter, control goes through STEP 8-9 and returns to the main routine.

If F·FIR=1, then control proceeds from STEP 5 to STEP 10 in a next cycle time. In STEP 10, the first operation controller 28 ascertains the start mode identifier S·SST. Since S·SST=1 (generation/charge mode) at this time, the first operation controller 28 ascertains a flag F·WUP indicative of whether the warming up of the internal combustion engine 14 has been finished or not (hereinafter referred to as a "warming-up decision flag F·WUP") (STEP 11).

The warming-up decision flag F·WUP is set "1" if an end of the warming up of the internal combustion engine 14 is confirmed in a warming-up process (STEP 12). Therefore, the warming-up decision flag F·WUP is "0" insofar as the internal combustion engine 14 is not warmed up.

If F·WUP=0 in STEP 11, the first operation controller 28 executes the warming-up process (STEP 12).

Figure 9:
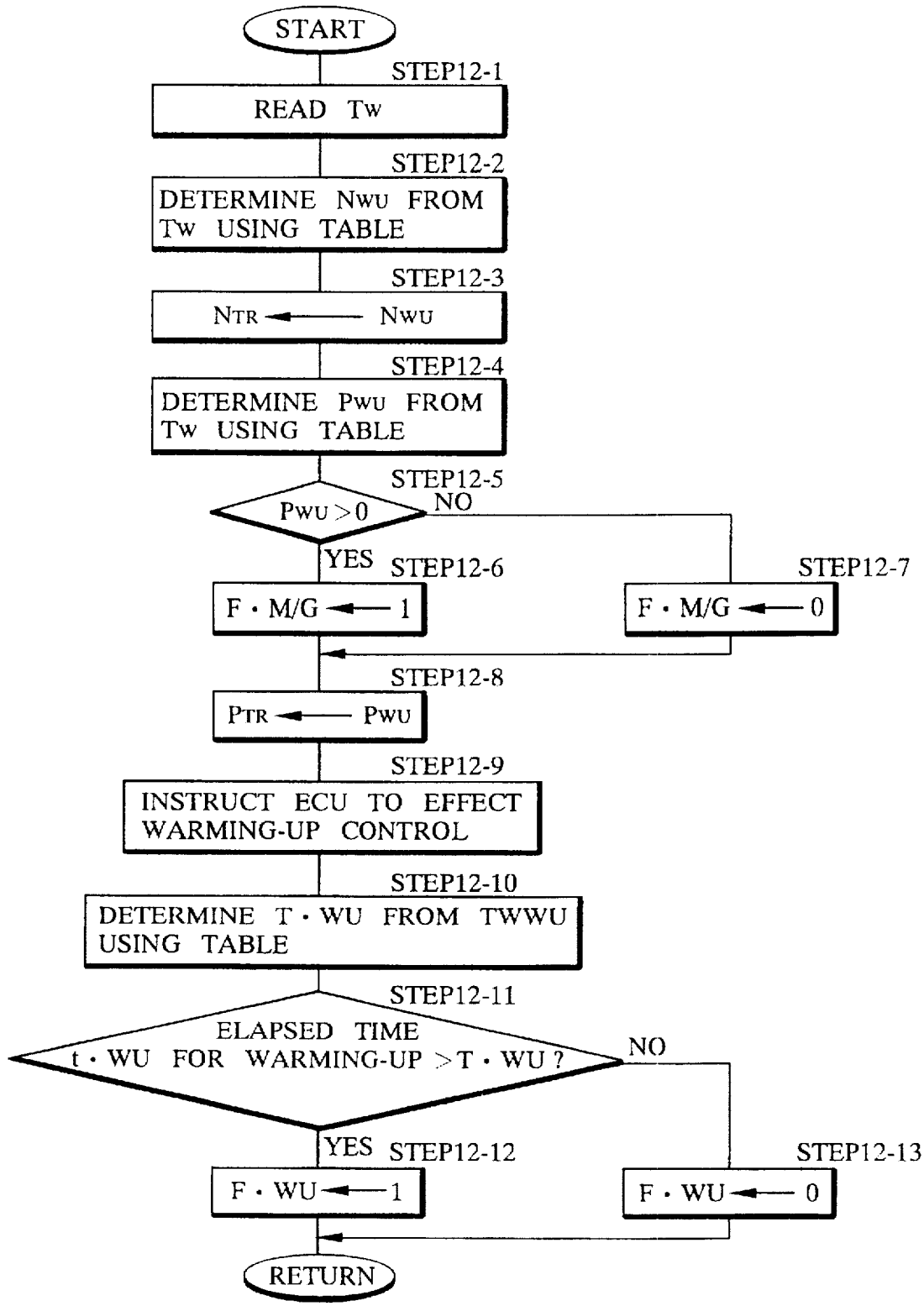
FIG. 9 is a flowchart of a further subroutine in the main routine shown in FIG. 2.

In the warming-up process, as shown in FIG. 9, the first operation controller 28 reads an engine temperature TW from the temperature sensor 21 (STEP 12-1), and determines a warming-up rotational speed NWU to warm up the internal combustion engine 14 from the read engine temperature TW according to a data table shown in FIG. 10 (STEP 12-2). Then, the first operation controller 28 establishes the warming-up rotational speed NWU as a target rotational speed NTR for the internal combustion engine 14 (STEP 12-3).

In order to generate electric power with the electric generator 16 while the internal combustion engine 14 is being warmed up, the first operation controller 28 determines a warming-up electric power output PWU to be outputted from the electric generator 16 from the read engine temperature TW according to a data table shown in FIG. 11 (STEP 12-4). warming-up rotational speeds NWU shown in FIG. 10 and warming-up electric power outputs PWU shown in FIG. 11 are determined in advance depending on engine temperatures TW, as rotational speeds and generated power outputs capable of stably warming up the internal combustion engine 14 and generating electric power with the electric generator 16 powered by the internal combustion engine 14 for a better emission control capability of the internal combustion engine 14. Inasmuch as the load on the internal combustion engine 14 should preferably be minimized for adequately warming up the internal combustion engine 14 when the internal combustion engine 14 is at higher temperatures, the warming-up electric power outputs PWU in the data table shown in FIG. 11 are negative in a high-temperature range of engine temperatures TW. Such negative warming-up electric power outputs PWU signify that the electric generator 16 operates as an electric motor rather than generating electric power.

Thereafter, the first operation controller 28 decides whether the warming-up electric power output PWU thus determined is positive or not (STEP 12-5). If PWU>0, then the first operation controller 28 sets the generator/motor switching flag F·M/G to "1" in order to generate electric power with the electric generator 16 (STEP 12-6). If PWU≦0, then the first operation controller 28 sets the generator/motor switching flag F·M/G to "0" in order to operate the electric generator 16 as an electric motor (STEP 12-7).

After having set the generator/motor switching flag F·M/G, the first operation controller 28 establishes the warming-up electric power output PWU determined in STEP 12-4 as a target electric power output PTR for the electric generator 16 (STEP 12-8), and instructs the ECU 17 to warm up the internal combustion engine 14 (STEP 12-9).

Then, the first operation controller 28 determines a time T·WU to warm up the internal combustion engine 14 (hereinafter referred to as a "warming-up indicating time T·WU") according to a data table shown in FIG. 12 from the warming-up time determining parameter TWWU (=the engine temperature TW at the time the starting of the internal combustion engine 14 is initiated) which has been determined in STEP 7 of the main routine when the starting of the internal combustion engine 14 is initiated (STEP 12-10). Warming-up indicating times T·WU are determined in advance for adequately warming up the internal combustion engine 14 depending on warming-up time determining parameters TWWU which are engine temperatures TW at the time the starting of the internal combustion engine 14 is initiated.

After having determined the warming-up indicating time T·WU, the first operation controller 28 decides whether a time t·WU that has elapsed from STEP 12-1 of the warming-up process exceeds the warming-up indicating time T·WU or not (STEP 12-11). If t·WU>T·WU, then the first operation controller 28 sets the warming-up decision flag F·WUP to "1" in STEP 12-12. If t·WU≦T·WU, then the first operation controller 28 sets the warming-up decision flag F·WUP to "0" in STEP 12-13. Thereafter, control returns to the main routine. Immediately after the warming-up process has started in this case, the time t·WU<T·WU, and the warming-up decision flag F·WUP is set to "0" in STEP 12-13.

After control returns to the main routine, the first operation controller 28 executes the data output process in STEP 9.

In the warming-up process (STEP 12), basically, the generator/motor switching flag F·M/G has been set to "1". In this case, after STEP 9-1 of the data output process, the first operation controller 28 determines a target amount IGTR of electric energy to be supplied by the electric generator 16 (STEP 9-6), and outputs the target amount IGTR of electric energy to the GCU 19 (STEP 9-7). The target amount IGTR of electric energy is determined according to a given data table and equation as an electric current to be supplied by the electric generator 16 (a charging current for the battery 3) for bringing an actual amount of electric power detected from a voltage and a current generated by the electric generator 16 and supplied from the GCU 19, and an actual rotational speed N of the engine 14 and the electric generator 16 detected by the rotational speed sensor 22 into conformity with the target rotational speed NTR (=the warming-up rotational speed NWU) established in STEP 12-3 and the target electric power output PTR (=the warming-up electric power output PWU). The first operation controller 28 monitors a command signal supplied from the vehicle propulsion manager 6 to subject the propulsive electric motor 4 to regenerative braking and an amount of regenerated electric power at the time. When the propulsive electric motor 4 is subjected to regenerative braking, the first operation controller 28 corrects the target electric power output PTR so that the sum of the regenerated electric power and the electric power generated by the electric generator 16 and the charging voltage of the battery 3 will not exceed predetermined maximum values for preventing the battery 3 from being excessively charged, and determines the target amount IGTR of electric energy depending on the corrected target electric power output PTR and the target rotational speed NTR.

The first operation controller 28 determines a target throttle valve opening THTR for the internal combustion engine 14 (STEP 9-8), and outputs the target throttle valve opening THTR to the ECU 17 (STEP 9-9). Thereafter, control goes back to the main routine. The target throttle valve opening THTR is determined according to a given data table and equation as a throttle valve opening for producing a power output of the internal combustion engine 14 corresponding to the target electric power output PTR and bringing the present rotational speed N of the internal combustion engine 14 into conformity with the target rotational speed NTR. When the propulsive electric motor 4 is subjected to regenerative braking, the target throttle valve opening THTR is determined depending on the corrected target electric power output PTR and the target rotational speed NTR in the same manner as described above.

The GCU 19 which is supplied with the target amount IGTR of electric energy controls the electric generator 16 through the generator power supply controller 18 in order to generate electric power with the electric generator 16 according to the target amount IGTR of electric energy. The ECU 17 which is supplied with the target throttle valve opening THTR controls the throttle valve opening of the internal combustion engine 14 through the throttle valve actuator 23 in order to equalize the throttle valve opening of the internal combustion engine 14 to the target throttle valve opening THTR.

The electric generator 16 is now powered by the internal combustion engine 14 as it is being warmed up to generate electric power depending on the target electric power output PTR (=PWU) and the target rotational speed NTR (=NWU), and the generated electric power is supplied to charge the battery 3 or energize the propulsive electric motor 4. According to the above warming-up process, it is possible, during the warming-up indicating time T·WU after the internal combustion engine 14 has started, to charge the battery 3 while warming up the internal combustion engine 14 without posing an excessive load on the internal combustion engine 14, with the amount of electric energy generated by the electric generator 16 and the corresponding load on the internal combustion engine 14 depending on the engine temperature TW.

If the generator/motor switching flag F·M/G" is set to "0" in the warming-up process (STEP 12), then the first operation controller 28 executes STEPs 9-1~9-5 in the data output process in STEP 9 in the same manner as when the internal combustion engine 14 is started. In this case, the electric generator 16 operates as an electric motor while the internal combustion engine 14 is being warmed up.

The internal combustion engine 14 is warmed up in successive cycle times. If the time T·WU that has elapsed in warming up the internal combustion engine 14 exceeds the warming-up indicating time T·WU in STEP 12-11 (see FIG. 9) of the warming-up process, then the warming-up decision flag F·WUP is set to "1" (STEP 12-12) as described above. If F·WUP=1, then after STEP 11 (see FIG. 2) of the main routine in a next cycle time, the warming-up process is ended, and control proceeds to a generation/charge process (STEP 13).

Figure 13:
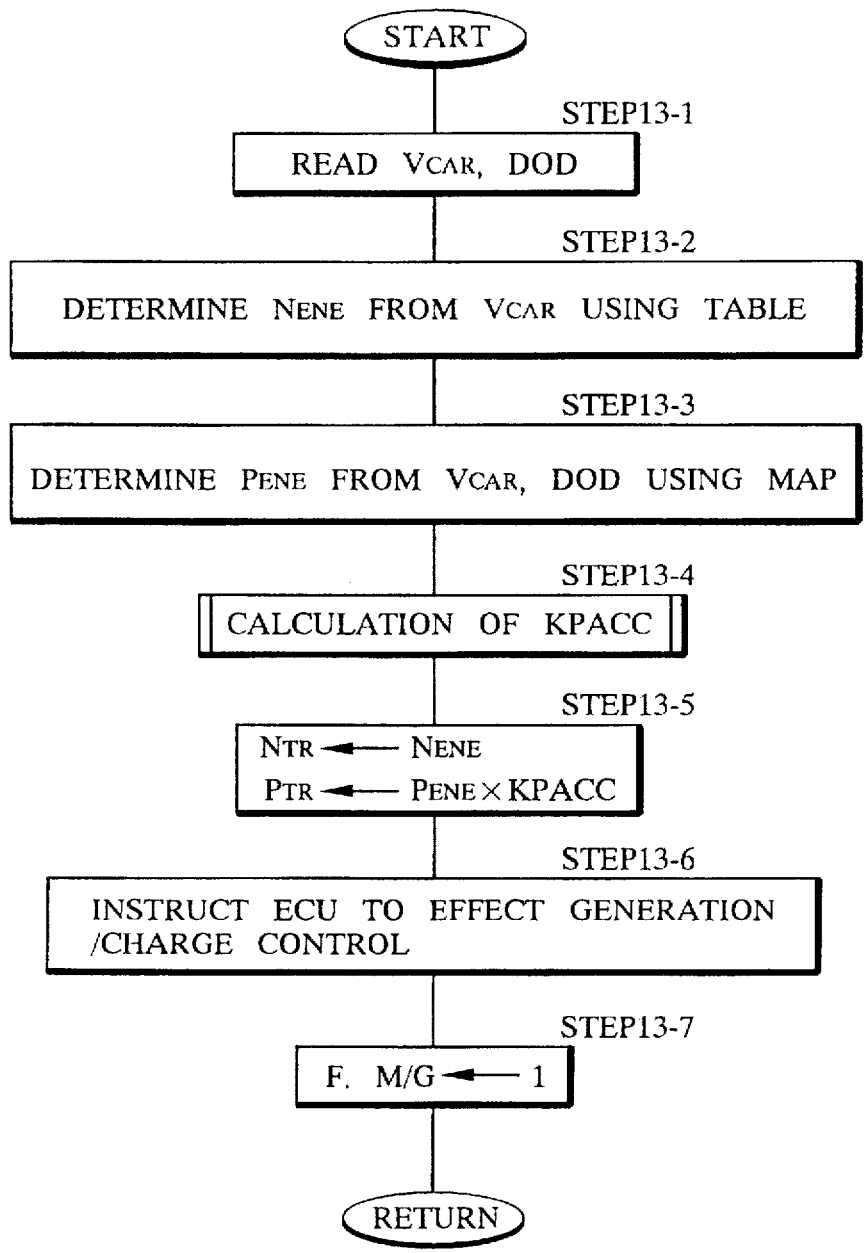
FIG. 13 is a flowchart of a still further subroutine in the main routine shown in FIG. 2.

In the generation/charge process, as shown in FIG. 13, the first operation controller 28 reads a present vehicle speed VCAR from the vehicle speed sensor 9 through the vehicle propulsion manager 6, and a present discharged depth DOD of the battery 3 from the discharged depth detector 13 of the vehicle propulsion manager 6 (STEP 13-1).

Figures 14, 15:
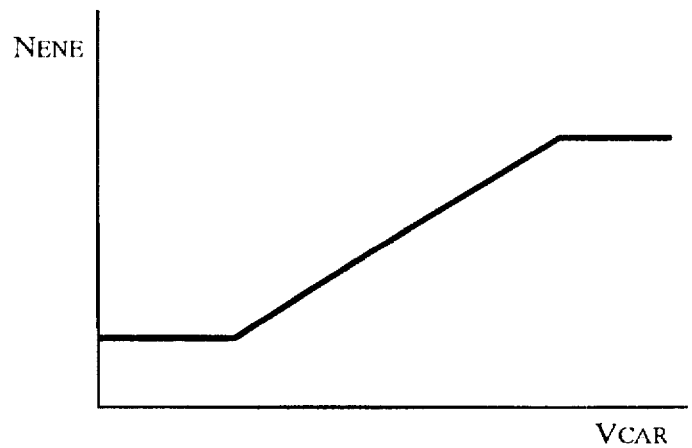
FIG. 14 is a diagram showing a data table used in the subroutine shown in FIG. 13.
FIG. 15 is a diagram showing a map used in the subroutine shown in FIG. 13.

From the vehicle speed VCAR which has been read, the first operation controller 28 determines a rotational speed NENE, at which the internal combustion engine 14 and the electric generator 16 are to rotate, depending on the vehicle speed VCAR according to a data table shown in FIG. 14 (STEP 13-2). Thereafter, the first operation controller 28 determines an electric power output PENE to be produced by the electric generator 16 depending on the vehicle speed VCAR and the discharged depth DOD according to a map shown in FIG. 15 (STEP 13-3). The rotational speeds NENE in the data table shown in FIG. 14 are basically established to enable the electric generator 16 to produce a greater electric power output as the electric energy consumed by the propulsive motor 4 increases with the vehicle speed VCAR. In the map shown in FIG. 15, the electric power output PENE increases as the vehicle speed VCAR and the discharged depth DOD increase. Basically, the rotational speed NENE and the electric power output PENE are greater than the warming-up rotational speed NWU and the warming-up electric power output PWU, respectively, in the warming-up process.

Figure 16:
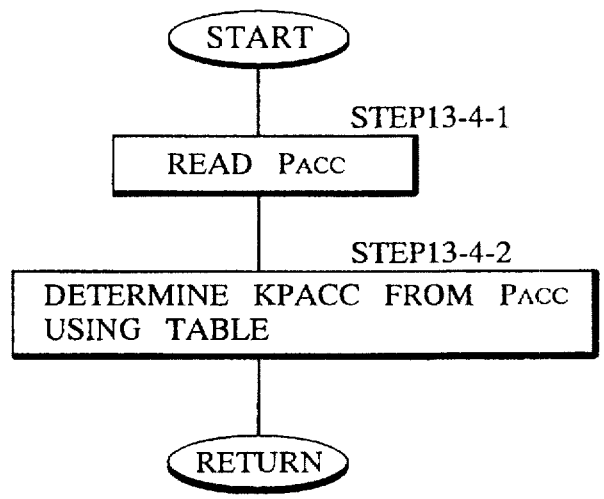
FIG. 16 is a flowchart of a subroutine in the subroutine shown in FIG. 13.
Figure 17:
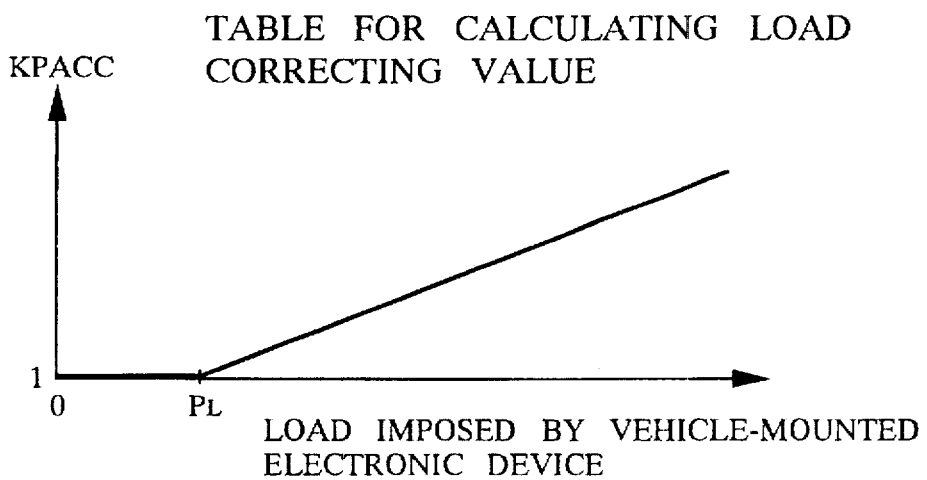
FIG. 17 is a diagram showing a data table used in the subroutine shown in FIG. 16.

After the rotational speed NENE and the electric power output PENE have been determined, the first operation controller 28 calculates a load correcting value KPACC for correcting the determined electric power output PENE depending on the load imposed by the vehicle-mounted electronic devices 30 (STEP 13-4). In a process of calculating a load correcting value KPACC, as shown in FIG. 16, the first operation controller 28 reads the load PACC imposed on the battery 3 by the vehicle-mounted electronic devices 30 as detected by the load detector 31 (STEP 13-4-1). Then, the first operation controller 28 determines a load correcting value KPACC from the load PACC using a data table shown in FIG. 17 (STEP 13-4-2). The load correcting value KPACC is a value of 1 or more. In the data table shown in FIG. 17, the load correcting value KPACC is KPACC=1 when the load PACC imposed by the vehicle-mounted electronic devices 30 is smaller than the predetermined amount PL (see FIG. 3), and the load correcting value KPACC increases with the load PACC when the load PACC is greater than the predetermined amount PL. After the load correcting value KPACC is determined, the first operation controller 28 establishes the rotational speed NENE as a target rotational speed NTR for the internal combustion engine 14, and also establishes the electric power output PENE as corrected by being multiplied by the load correcting value KPACC, as a target electric power output PTR for the electric generator 16 (STEP 13-5). The first operation controller 28 instructs the ECU 17 and the GCU 19 to carry out a generation/charge control process (STEP 13-6), and then sets the generator/motor switching flag F·M/G to "1" in order to generate electric power output with the electric generator 16 (STEP 13-7). Thereafter, control returns to the main routine.

The first operation controller 28 then executes the data output process (STEP 9) of the main routine. Since the generator/motor switching flag F·M/G has been set to "0" in the generation/charge process, the first operation controller 28 carries out STEPs 9-6~9-9 in the data output process the same manner as with the warming-up process. The first operation controller 28 determines a target amount IGTR of electric energy to be supplied by the electric generator 16 and a target throttle valve opening THTR for the internal combustion engine 14, depending on the target rotational speed NTR and the target electric power output PTR which have been established in the above generation/charge process, and outputs the target amount IGTR of electric energy and the target throttle valve opening THTR to the GCU 19 and the ECU 17. When the propulsive electric motor 4 is subjected to regenerative braking, the target amount IGTR of electric energy and the target throttle valve opening THTR are determined in the same manner as with the warming-up process.

The GCU 19 which is supplied with the target amount IGTR of electric energy controls the electric generator 16 through the generator power supply controller 18 in order to generate electric power with the electric generator 16 according to the target amount IGTR of electric energy. The ECU 17 which is supplied with the target throttle valve opening THTR controls the throttle valve opening of the internal combustion engine 14 through the throttle valve actuator 23 in order to equalize the throttle valve opening of the internal combustion engine 14 to the target throttle valve opening THTR.

The electric generator 16 is now powered by the internal combustion engine 14 to generate electric power depending on the target electric power output PTR (=PENE×KPACC) and the target rotational speed NTR (=NENE), and the generated electric power is supplied to charge the battery 3 or energize the propulsive electric motor 4. Since the electric generator 16 generates a sufficient amount of electric power depending on the vehicle speed VCAR and the discharged depth DOD of the battery 3, the battery 3 is efficiently charged. Inasmuch as the target electric power output PTR is produced by correcting the electric power output PENE depending on the vehicle speed VCAR and the discharged depth DOD with the load correcting value KPACC, the target electric power output PTR is greater as the load PACC imposed on the battery 3 by the vehicle-mounted electronic devices 30 is larger. Therefore, even when the electric power consumed by the vehicle-mounted electronic devices 30 is relatively large, the electric generator 16 generates a correspondingly large amount of electric power, and the consumption by the vehicle-mounted electronic devices 30 of the electric energy stored in the battery 3 is suppressed, so that the battery 3 can be charged adequately in a well balanced fashion.

The electric generator 16 generates electric power and the battery 3 is charged until the discharged depth DOD of the battery 3 drops below 50% and the load PACC imposed on the battery 3 by the vehicle-mounted electronic devices 30 becomes lower than the predetermined amount PL in the start decision process (STEP 1) of the main routine which is executed in every cycle time.

Specifically, if DOD<50% in STEP 1-3 and PACC<PL in STEP 1-6 of the start decision process shown in FIG. 3, then control goes through STEPs 1-7, 1-8 to STEP 1-10 in which the start mode identifier S·SST is set to "0", whereupon the electric power generating apparatus 2 enters the non-start/stop mode. Since the internal combustion engine 14 has been operated, the adsorbed amount H/C of a purged gas in the canister 25 is smaller than the predetermined adsorbed amount H/C0, and hence control does not proceed from STEP 1-8 to STEP 1-9.

Figure 18:
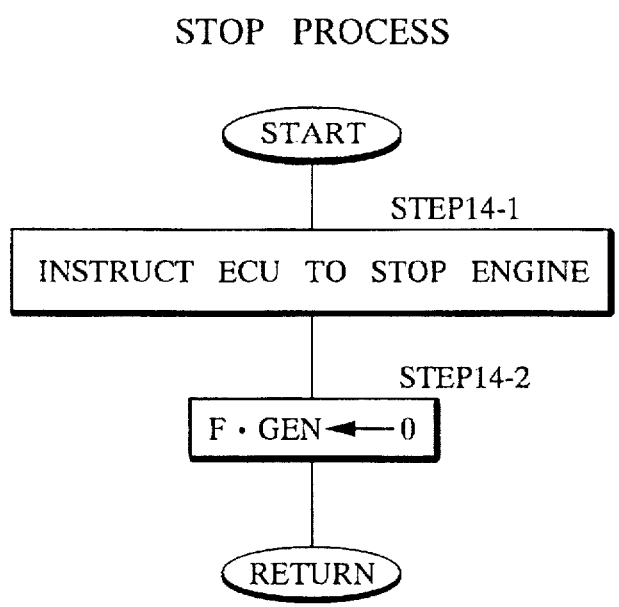
FIG. 18 is a flowchart of still another subroutine in the main routine shown in FIG. 2.

Since S·SST=0 in STEP 2 of the main routine shown in FIG. 2, control now goes from STEP 2 to STEP 14 in which the first operation controller 28 executes a stop process as a subroutine. In the stop process, as shown in FIG. 18, the first operation controller 28 instructs the ECU 17 to stop the internal combustion engine 14 (STEP 14-1), and resets the start initiation flag F·GEN to "0" (STEP 14-2). Thereafter, control goes back to the main routine. The internal combustion engine 14 and the electric generator 16 coupled thereto stop their operation, and the electric power generating apparatus 2 stops its operation.

If the start mode identifier S·SST is set to "2" when the electric power generating apparatus 2 stops its operation in the start decision process (STEP 1), the electric power generating apparatus 2 now enters the canister purge mode. The start mode identifier S·SST is set to "2" when the adsorbed amount H/C of a purged gas in the canister 25, which is supplied from the H/C sensor to the electric power generation manager 20, is smaller than the predetermined adsorbed amount H/C0while the electric power generating apparatus 2 stops its operation, the discharged depth DOD of the battery 3 is equal to or lower than 80%, and the load PACC imposed by the vehicle-mounted electronic devices 30 is kept smaller than the predetermined amount PL. In this case, the canister 25 needs to be purged.

When the canister purge mode (S·SST=2) is established in the start decision process in STEP 1 of the main routine shown in FIG. 2, the electric power generation manager 20 confirms that S·SST≠0 in STEP 2, and thereafter the second operation controller 29 executes STEPs 3–9 in every cycle time to start the internal combustion engine 14. At this time, the second operation controller 29 starts the internal combustion engine 14 by executing the start initiation process in STEP 3, the engine start process in STEP 8, and the data output process in STEP 9 in the same manner as the first operation controller 28 does.

If the full ignition decision flag F·FIR established in the engine start process in STEP 8 is "1", confirming that the internal combustion engine 14 is in a fully ignited condition, then control goes from STEP 5 to STEP 10. In STEP 10, the second operation controller 29 confirms that S·SST≠1. Thereafter, control proceeds to a purge process as a subroutine in STEP 15.

Figure 19:
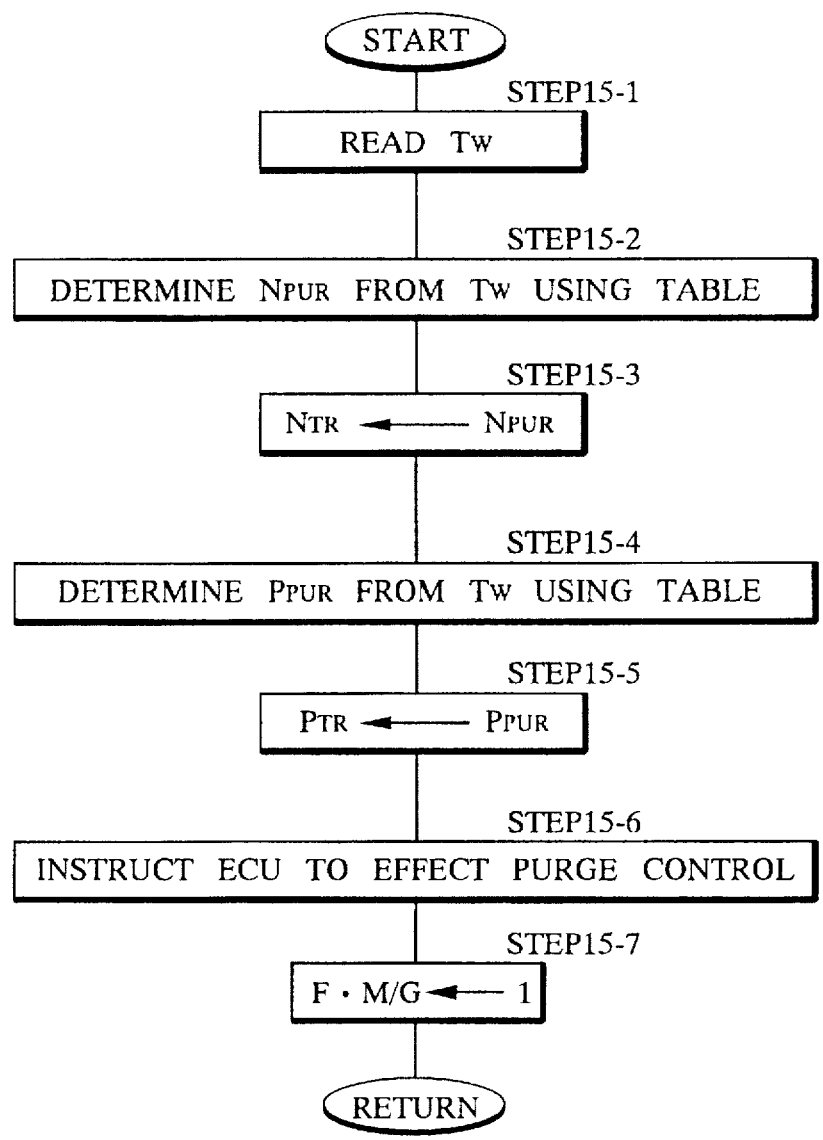
FIG. 19 is a flowchart of yet still another subroutine in the main routine shown in FIG. 2.

In the purge process, as shown in FIG. 19, the second operation controller 29 reads an engine temperature TW from the temperature sensor 21 (STEP 15-1), and determines a rotational speed NPUR at which to operate the internal combustion engine 14 (hereinafter referred to as a "purge rotational speed NPUR") for purging the canister 25 from the read engine temperature TW according to a data table shown in FIG. 20 (STEP 15-2), and then establishes the determined purge rotational speed NPUR as a target rotational speed NTR (STEP 15-3). In order to generate electric power from the electric generator 16 while purging the canister 25, the second operation controller 29 determines an electric power output PPUR to be generated by the electric generator 16 (hereinafter referred to as a "purge electric power output PPUR") from the read engine temperature TW according to a data table shown in FIG. 21 (STEP 15-4), and then establishes the determined purge electric power output PPUR as a target electric power output PTR (STEP 15-5).

Figure 20:
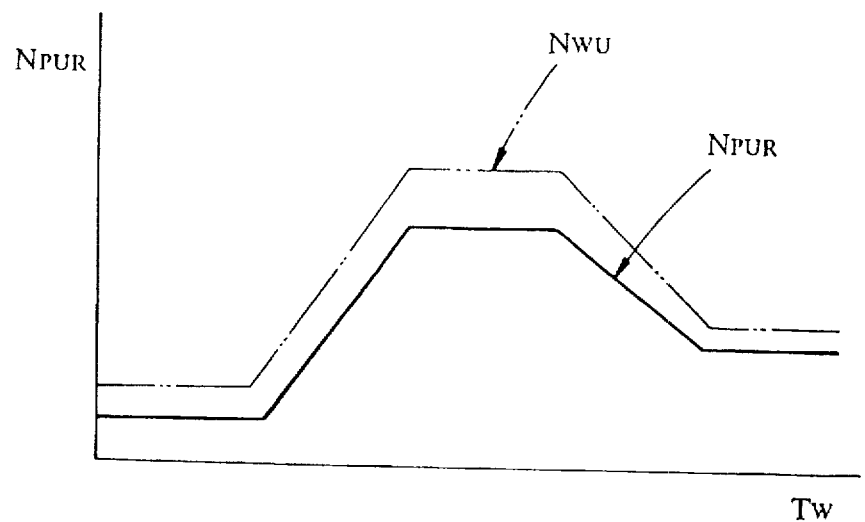
FIG. 20 is a diagram showing a data table used in the subroutine shown in FIG. 17.
Figure 21:
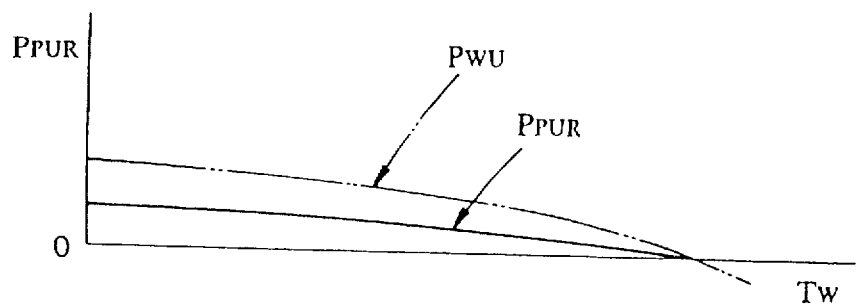
FIG. 21 is a diagram showing another data table used in the subroutine shown in FIG. 17.

The purge rotational speed NPUR in the data table shown in FIG. 20 and the purge electric power output PPUR in the data table shown in FIG. 21 are basically determined so as to be lower than the warming-up rotational speed NWU (indicated by the imaginary line in FIG. 20) and the warming-up electric power output PWU (indicated by the imaginary line in FIG. 21) respectively in the warming-up process, and also lower than a rotational speed NENE and a generated electric power output PENE in the generation/charge process, and also determined such that the load on the engine 14 is small or nil so as to be suitable for the engine temperature TW.

After having established the target rotational speed NTR (=NPUR) and the target electric power output PTR (=PPUR), the second operation controller 29 instructs the ECU 17 to effect a purge control process (STEP 15-6), and sets the generator/motor switching flag F·M/G to "1" in order to cause the electric generator 16 to generate electric power (STEP 15-7). Thereafter, control returns to the main routine.

Then, in the same manner as with the generation/charge mode, the second operation controller 29 executes the data output process (STEP 9) of the main routine, determines a target amount IGTR of electric energy to be supplied by the electric generator 16 and a target throttle valve opening THTR for the internal combustion engine 14 depending on the target rotational speed NTR (=NPUR) and the target electric power output PTR (=PPUR) established in the purge process, and outputs the target amount IGTR of electric energy and the target throttle valve opening THTR thus determined to the GCU 19 and the ECU 17 (STEPs 9-6–9-9 in FIG. 8).

The GCU 19 which is supplied with the target amount IGTR of electric energy controls the electric generator 16 through the generator power supply controller 18 in order to generate electric power with the electric generator 16 according to the target amount IGTR of electric energy. The ECU 17 which is supplied with the target throttle valve opening THTR controls the throttle valve opening of the internal combustion engine 14 through the throttle valve actuator 23 in order to equalize the throttle valve opening of the internal combustion engine 14 to the target throttle valve opening THTR.

The internal combustion engine 14 and the electric generator 16 are now operated at the target rotational speed NTR (=NPUR), and the electric generator 16 generates the target electric power output PTR (=PPUR) (generates no electric power output when PTR=0). The canister 25 of the fuel supply unit 24 is now purged, and the battery 3 is somewhat charged.

As described above, the purge rotational speed NPUR which is the target rotational speed NTR is set to a relatively low value, and the purge electric power output PPUR which is the target electric power output PTR is also set to a relatively low value. Consequently, the load on the internal combustion engine 14 is small or nil. The canister 25 can thus be purged efficiently while the exhaust gases emitted from the internal combustion engine 14 are being minimized. Since a certain amount of electric power is generated by the electric generator 16, the battery 3 can somewhat be charged effectively utilizing drive forces which are produced by the internal combustion engine 14 to purge the canister 25. Because the target rotational speed NTR (=NPUR) and the target electric power output PTR (=PPUR) are established depending on the engine temperature TW, the internal combustion engine 14 and the electric generator 16 can be operated in their suitable modes of operation. Accordingly, the load imposed on the internal combustion engine 14 is minimized to suppress the emission of excessive exhaust gases.

If the adsorbed amount H/C of a purged gas in the canister 25 detected by the H/C sensor 26 becomes smaller than the predetermined adsorbed amount H/C0 while the canister 25 is being thus purged, control goes from STEP 1-8 to STEP 1-10 in the start decision process shown in FIG. 3, and the electric power generation manager 20 sets the start mode identifier S-SST to "0" (STEP 1-10), establishing the nonstart/stop mode. At this time, the second operation controller 29 executes the stop process in STEP 14 of the main routine (see FIGS. 2 and 16), stopping the operation of the electric power generating apparatus 2, in the same manner as the first operation controller 28 does.

In this embodiment, the internal combustion engine 14 and the electric generator 16 are operated in different modes for charging the battery 3 whose stored amount of electric energy has been reduced and for purging the canister 25. Therefore, the internal combustion engine 14 and the electric generator 16 can be operated adequately in respective modes suitable to fulfill different purposes. Specifically, for charging the battery 3, the internal combustion engine 14 is warmed up without an excessive load imposed thereon, depending on the engine temperature TW, and thereafter the internal combustion engine 14 and the electric generator 16 are operated depending on a running condition of the vehicle as represented by the vehicle speed VCAR and a charged/discharged state of the battery 3 as represented by the discharged depth DOD, for appropriately charging the battery 3. For purging the canister 25, the internal combustion engine 14 and the electric generator 16 are operated while minimizing the load on the internal combustion engine 14, depending on the engine temperature TW, so that the canister 25 can be purged efficiently and the emission of excessive exhaust gases from the internal combustion engine 14 can be minimized.

Furthermore, in the generation/charge process, the electric power output PENE to be produced by the electric generator 16 depending on the discharged depth DOD of the battery 3 and the vehicle speed VCAR of the hybrid vehicle is corrected by the load correcting value KPACC depending on the load PACC imposed on the battery 3 by the vehicle-mounted electronic devices 30 for thereby establishing a target electric power output PTR (=PENE×KPACC) for the electric generator 16, and the electric generator 16 and the internal combustion engine 14 are controlled for enabling the electric generator 16 to generate the target electric power output PTR. Consequently, the electric power output generated by the electric generator 16 depends on the load PACC imposed on the battery 3 by the vehicle-mounted electronic devices 30, other than the propulsive motor 4, as well as the discharged depth DOD representing the stored amount of electric energy in the battery 3 and the electric power consumption by the propulsive motor 4 depending on the vehicle speed VCAR. Regardless of the manner in which the vehicle-mounted electronic devices 30 are used, the battery 3 can efficiently and adequately be charged, while its stored energy consumption is being suppressed, with a well balanced amount of generated electric power depending on the charged and discharged state of the battery 3.

When the load PACC imposed on the battery 3 by the vehicle-mounted electronic devices 30 becomes greater than the predetermined amount PL, i.e., load PACC imposed on the battery 3 by the vehicle-mounted electronic devices 30 becomes relatively large, even if the stored amount of electric energy in the battery 3 is relatively large, the internal combustion engine 14 and the electric generator 16 are started to charge the battery 3 according to the generation/charge mode. Since, therefore, the electric power generating apparatus 2 is started early to charge the battery 3 when the electric energy stored in the battery 3 tends to be consumed rapidly by the vehicle-mounted electronic devices 30, the electric energy stored in the battery 3 is reliably prevented from being excessively consumed.

In the illustrated embodiment, when the discharged depth DOD of the battery 3 exceeds a predetermined value (80%), i.e., when the amount of electric energy stored in the battery 3 drops below a predetermined level, the electric power generating apparatus 2 is started to charge the battery 3 according to the generation/charge mode. However, the electric power generating apparatus 2 may be started to charge the battery 3 according to the generation/charge mode when the battery 3 is largely discharged with the time-dependent rate of increase of the discharged amount being in excess of a predetermined value (at this time, the discharged depth DOD increases sharply), as when the vehicle is quickly accelerated. In such a case, the time-dependent rate of increase of the discharged depth DOD may be compared with a predetermined value between STEP 1-2 and STEP 1-3 of the start decision process shown in FIG. 3, and if the time-dependent rate of increase of the discharged amount is greater than the predetermined value, then the generation/charge mode may be established in STEP 1-4, and if the time-dependent rate of increase of the discharged amount is smaller than the predetermined value, then STEP 1-3 may be executed.

In the illustrated embodiment, the electric power output PENE to be produced by the electric generator 16 depending on the discharged depth DOD of the battery 3 and the vehicle speed VCAR of the hybrid vehicle is corrected by the load correcting value KPACC depending on the load PACC imposed on the battery 3 by the vehicle-mounted electronic devices 30 for thereby establishing a target electric power output PTR (=PENE×KPACC) for the electric generator 16. However, a target electric power output PTR may be established directly from the discharged depth DOD of the battery 3, the vehicle speed VCAR of the hybrid vehicle, and the load PACC imposed on the battery 3 by the vehicle-mounted electronic devices 30 according to a three-dimensional map or predetermined equations.

While the internal combustion engine 14 and the electric generator 16 are started depending on the load PACC imposed on the battery 3 by the vehicle-mounted electronic devices 30 and the amount of electric energy generated by the electric generator 16 is corrected, the processing effected depending on the load PACC imposed on the battery 3 may be dispensed with if a power supply separate from the battery 3 is employed for energizing the vehicle-mounted electronic devices 30. In such a modification, the load detector 31 shown in FIG. 1 may be dispensed with. STEPs 1-2 and 1-6 of the start decision process shown in FIG. 3 may be dispensed with, and STEP 13-4 of the generation/charge process shown in FIG. 13 may be dispensed with.

Although a certain preferred embodiment of the present invention has been shown and described in detail, it should be understood that various changes and modifications may be made therein without departing from the scope of the appended claims.

What is claimed is:

1. A control system for controlling an electric power generating apparatus mounted on a vehicle which has a propulsive electric motor powered by a battery, and having an electric generator and an internal combustion engine for actuating the electric generator to generate an electric power output to charge the battery depending on a charged/discharged state of the battery, comprising:

charged/discharged state detecting means for detecting a charged/discharged state of the battery;

purged-gas adsorbed state detecting means for detecting an adsorbed state of a purged gas in a canister disposed in a fuel supply system of the internal combustion engine;

first operation control means for operating the internal combustion engine to enable the electric generator to charge the battery if said charged/discharged state detecting means detects when an amount of electric energy stored in the battery is smaller than a predetermined value or when a time-dependent rate of increase of an amount of electric energy discharged from the battery is greater than a predetermined level; and second operation control means for operating the internal combustion engine to purge the canister if the charged/discharged state of the battery detected by said charged/discharged state detecting means fails to satisfy a condition for said first operation control means to operate the internal combustion engine and if said purged-gas adsorbed state detecting means detects when an amount of the purged gas adsorbed in the canister is greater than a predetermined amount;

wherein the first and second operation control means operate the internal combustion engine in modes established respectively for the first and second operation control means such that a load imposed on the internal combustion engine when the internal combustion engine is operated by at least said second operation control means is smaller than a load imposed on the internal combustion engine when the internal combustion engine is operated by said first operation control means.

2. A control system according to claim 1, wherein the first and second operation control means have means for controlling a rotational speed of the internal combustion engine after the internal combustion engine is started, and wherein the rotational speed of the internal combustion engine controlled by said second operation control means is lower than the rotational speed of the internal combustion engine controlled by said first operation control means.

3. A control system according to claim 2, wherein the rotational speed of the internal combustion engine controlled by said second operation control means depends on an engine temperature of the internal combustion engine.

4. A control system according to claim 2, wherein the rotational speed of the internal combustion engine controlled by said first operation control means depends on an engine temperature of the internal combustion engine for a predetermined period of time after the internal combustion engine is started, and depends on a vehicle speed of the vehicle after elapse of said predetermined period of time.

5. A control system according to claim 1, wherein the first and second operation control means have means for controlling an amount of electric power generated by the electric generator after the internal combustion engine is started, and wherein the amount of electric power generated by the electric generator controlled by said second operation control means is lower than the amount of electric power generated by the electric generator controlled by said first operation control means.

6. A control system according to claim 5, wherein the amount of electric power generated by the electric generator controlled by said second operation control means depends on an engine temperature of the internal combustion engine.

7. A control system according to claim 5, wherein the amount of electric power generated by the electric generator controlled by said second operation control means depends on an engine temperature of the internal combustion engine for a predetermined period of time after the internal combustion engine is started, and depends on a vehicle speed of the vehicle and the charged/discharged state of the battery detected by said charged/discharged state detecting means after elapse of said predetermined period of time.

\* \* \* \* \*